US012720510B2

(12) United States Patent
Lee et al.

(10) Patent No.: US 12,720,510 B2
(45) Date of Patent: Aug. 25, 2026

(54) ELECTRONIC DEVICE FOR ADJUSTING FREQUENCY OF REFERENCE SIGNAL USED TO GENERATE RF SIGNAL

(71) Applicant: SAMSUNG ELECTRONICS CO., LTD., Suwon-si (KR)

(72) Inventors: Yousung Lee, Suwon-si (KR); Hyoseok Na, Suwon-si (KR); Dongil Yang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 510 days.

(21) Appl. No.: 17/946,780

(22) Filed: Sep. 16, 2022

(65) Prior Publication Data

US 2023/0085553 A1 Mar. 16, 2023

Related U.S. Application Data

(63) Continuation of application No. PCT/KR2022/011316, filed on Aug. 1, 2022.

(30) Foreign Application Priority Data

Aug. 30, 2021 (KR) ........................ 10-2021-0114924

(51) Int. Cl.
*H04W 72/0453* (2023.01)
*H04L 43/0823* (2022.01)
*H04W 52/14* (2009.01)

(52) U.S. Cl.
CPC ..... *H04W 72/0453* (2013.01); *H04L 43/0823* (2013.01); *H04W 52/146* (2013.01)

(58) Field of Classification Search
CPC .............. H04L 5/0053; H04W 74/085; H04W 74/0866; H04W 52/367; H04B 1/0475; H04B 1/525
See application file for complete search history.

(56) References Cited

U.S. PATENT DOCUMENTS 9,026,125 B2 5/2015 Dhanda et al.
9,231,530 B1 * 1/2016 Kaushik ................ H03F 1/3247
(Continued)

FOREIGN PATENT DOCUMENTS

JP 2014-236491 A 12/2014
KR 10-1051686 B1 7/2011
KR 10-2020-0043735 A 4/2020

OTHER PUBLICATIONS

Mming Huo et al., “5G Cellular User Equipment: From Theory to Practical Hardware Design”, arXiv:1704.02540v3 [cs.IT], URL: https://arxiv.org/pdf/1704.02540.pdf, Jul. 19, 2017, (18 total pages).
(Continued)

*Primary Examiner* — Robert C Scheibel
*Assistant Examiner* — Sang C Lee
(74) *Attorney, Agent, or Firm* — Sughrue Mion, PLLC

(57) ABSTRACT

An electronic device may include: an antenna; a radio frequency integrated circuit (RFIC) configured to: generate a first radio frequency (RF) signal in a first frequency band to be used in cellular communication by mixing a first baseband signal with a first reference signal, output the first RF signal to the antenna, receive, from the antenna, a second RF signal in a second frequency band to be used in the cellular communication, generate a second baseband signal by mixing the second RF signal with a second reference signal, and output the second baseband signal; and a processor is configured to: obtain, from the second baseband signal output by the RFIC, a control signal for establishing a communication channel between a base station and the electronic device, identify, from the control signal, a first condition for causing desense of the second RF signal, and based on the first condition being satisfied, adjust a frequency of the first reference signal.

20 Claims, 16 Drawing Sheets

(56) References Cited

U.S. PATENT DOCUMENTS 10,972,145 B1 * 4/2021 Klomsdorf ............... H04B 1/48
11,405,069 B2 8/2022 Cho et al.
2004/0203548 A1 10/2004 Kim
2012/0178386 A1 7/2012 Pascolini et al.
2012/0214426 A1 8/2012 Koller et al.
2015/0180685 A1 6/2015 Noest et al.
2015/0270813 A1 9/2015 Morshedi et al.
2015/0334710 A1 * 11/2015 Tang ........................ H04B 1/30 370/329
2016/0329920 A1 11/2016 Li
2017/0104507 A1 4/2017 Fernando et al.
2018/0019865 A1 * 1/2018 Lee ....................... H04J 3/0685
2019/0165975 A1 * 5/2019 Sung ................... H04L 27/2272
2020/0127698 A1 * 4/2020 Cho ..................... H04B 1/0057
2020/0260265 A1 * 8/2020 Jin .......................... H04W 8/24
2020/0280466 A1 * 9/2020 Cui ..................... H04L 25/0226
2021/0021326 A1 * 1/2021 Cui ...................... H04B 17/309

OTHER PUBLICATIONS

International Search Report (PCT/ISA/237) and Written Opinion (PCT/ISA/237) dated Nov. 1, 2022 issued by the International Searching Authority in International Application No. PCT/KR2022/011316.

Communication issued on Sep. 26, 2024 by the European Patent Office in European Patent Application No. 22864884.6.

Communication issued Sep. 4, 2025 by the Korean Intellectual Property Office in Korean Patent Application No. 10-2021-0114924.

* cited by examiner

FIG. 1

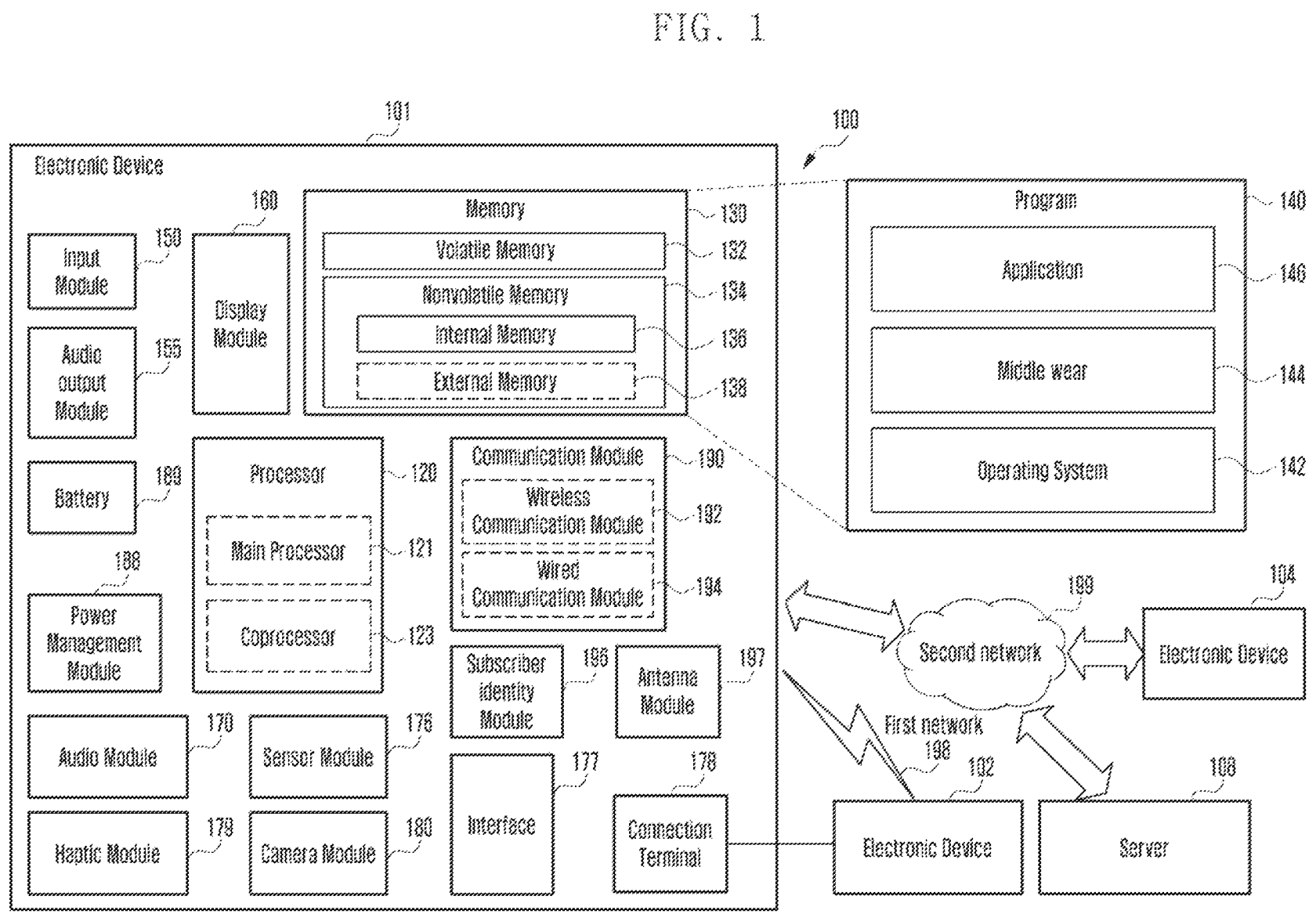

100
101 Electronic Device
150 Input Module
155 Audio output Module
189 Battery
188 Power Management Module
160 Display Module
120 Processor
121 Main Processor
123 Coprocessor
130 Memory
132 Volatile Memory
134 Nonvolatile Memory
136 Internal Memory
138 External Memory
190 Communication Module
192 Wireless Communication Module
194 Wired Communication Module
196 Subscriber Identity Module
197 Antenna Module
170 Audio Module
176 Sensor Module
177 Interface
178 Connection Terminal
179 Haptic Module
180 Camera Module
140 Program
146 Application
144 Middle wear
142 Operating System
198 First network
199 Second network
102 Electronic Device
104 Electronic Device
108 Server

FIG. 2

300
306
MEMORY
360
FREQUENCY CONFIGURATION INFORMATION
305
APPLICATION PROCESSOR
340
COMMUNICATION PROCESSOR
302
CELLULAR COMMUNICATION CIRCUIT
330
FIRST RFIC
332
332a
332b
332c
332d
332e
331
331a
331b
331c
331d
331e
333
INTERFACE MODULE
320
FIRST RFFE
321
321a
321b
322
323
303
WI-FI COMMUNICATION CIRCUIT
351
SECOND RFFE
352
SECOND RFIC
304
GPS RECEPTION SIGNAL
361
THIRD RFFE
362
THIRD RFIC
301
311
312
313
a
b
c
d
e
f
g
h

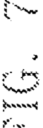
FIG. 7
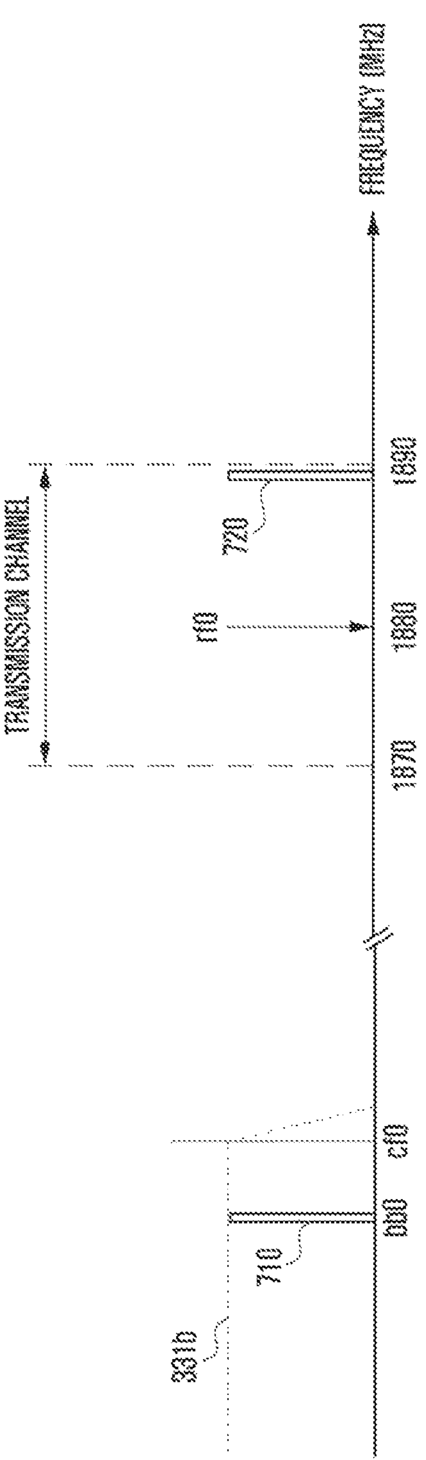
FREQUENCY [MHz]
TRANSMISSION CHANNEL
720
rf0
1890
1880
1870
cf0
bb0
710
331b

ELECTRONIC DEVICE FOR ADJUSTING FREQUENCY OF REFERENCE SIGNAL USED TO GENERATE RF SIGNAL

CROSS-REFERENCE TO RELATED APPLICATIONS

This application is a bypass continuation of PCT International Application No. PCT/KR2022/011316, filed on Aug. 1, 2022, which claims priority to Korean Patent Application No. 10-2021-0114924, filed on Aug. 30, 2021, in the Korean Intellectual Property Office, the disclosures of which are incorporated by reference herein their entireties.

BACKGROUND

1. Field

The disclosure relates to an electronic device for adjusting the frequency of a reference signal (e.g., a local oscillator (LO) signal) used to generate an RF signal of a radio frequency integrated circuit (RFIC).

2. Description of Related Art

An electronic device may have an RFIC for cellular communication (e.g., 5G or legacy). The RFIC may generate an RF (radio frequency) signal in a specified frequency band to be used for cellular communication by mixing a baseband signal received from a modem (e.g., a communication processor) of an electronic device with a reference signal for transmission, and transmit the RF signal to the outside through an antenna. The RFIC may receive an RF signal through an antenna, convert the received RF signal into a baseband signal by mixing the RF signal with a reference signal for reception, and output the baseband signal to a modem.

Undesired intermodulation distortion (IMD) signals may be generated in the process of generating an RF signal to be transmitted to the outside through an antenna (hereinafter, a TX RF signal) using a reference signal for transmission. The generated IMD signal may be combined with a TX RF signal to generate a secondary IMD signal. The secondary IMD signal may adversely affect the RF signal received by the RFIC through the antenna (hereinafter, an RX RF signal). For example, the secondary IMD signal may leak into a reception circuit of the RFIC. The frequency band of the leaked secondary IMD signal may overlap at least a portion of the frequency band of an RX RF signal, thereby causing so-called desense that degrades the sensitivity of the RX RF signal. For example, as the frequency bands of the TX RF signal and the RX RF signal are narrower and/or as the power of the TX RF signal is higher, the possibility of occurrence of desense (degraded sensitivity) may increase.

Various embodiments of the disclosure may provide an electronic device capable of minimizing desense by adjusting the frequency band of a reference signal for transmission such that the frequency band of the secondary IMD signal does not overlap the frequency band of the RX RF signal.

The technical problems to be solved in the disclosure are not limited to the technical problems mentioned above, and other technical problems that are not mentioned may be clearly understood by those of ordinary skill in the art to which the disclosure belongs from the description below.

SUMMARY

According to an aspect of the disclosure, an electronic device includes: an antenna; a radio frequency integrated circuit (RFIC) configured to: generate a first radio frequency (RF) signal in a frequency band to be used in cellular communication by mixing a first baseband signal with a first reference signal, output the first RF signal to the antenna, receive, from the antenna, a second RF signal in a frequency band to be used in the cellular communication, generate a second baseband signal by mixing the second RF signal with a second reference signal, and output the second baseband signal; and a processor is configured to: obtain, from the second baseband signal output by the RFIC, a control signal for establishing a communication channel between a base station and the electronic device, identify, from the control signal, a first condition for causing desense of the second RF signal, and based on the first condition being satisfied, adjust a frequency of the first reference signal.

The processor may be further configured to: obtain a reception signal strength of the second RF signal received from the base station through the antenna using the RFIC, based on the reception signal strength, configure a power of the first RF signal to be transmitted to the base station through the antenna, and based on the power being configured to be greater than or equal to a threshold value and the first condition being satisfied, adjust the frequency of the first reference signal.

The processor may be further configured to: identify an error rate of the second baseband signal received from the RFIC, and based on the measured error rate being identified to be equal to or greater than a threshold value and the first condition being satisfied, adjust the frequency of the first reference signal.

A value capable of being configured as the frequency of the first reference signal may be a default value, a first value that is greater than the default value, or a second value that is smaller than the default value, and the processor may be further configured to: based on the measured error rate being identified to be equal to or greater than a threshold value and the first condition being satisfied, change the frequency of the first reference signal from the default value to one of the first value and the second value, and based on the measured error rate being identified to be equal to or greater than the threshold value in the state in which the frequency of the first reference signal is configured as one of the first value and the second value, change the frequency of the first reference signal to a remaining one of the first value and the second value.

The first condition may include: a number of a transmission channel; a bandwidth of the transmission channel; the frequency band of the first RF signal to be transmitted to the base station through the antenna in the transmission channel; and the frequency band of the second RF signal received from the base station in a reception channel.

The electronic device may further include a wireless communication circuit configured to support wireless communication other than the cellular communication, wherein the processor may be further configured to: identify that a second condition for causing desense of a third RF signal received by the wireless communication circuit from an outside is included in the control signal, and based on the second condition being included in the control signal, adjust the frequency of the first reference signal.

The RFIC may be further configured to generate the first RF signal in an uplink band having a center frequency of about 2.4 GHz, and the wireless communication circuit may include a Wi-Fi communication circuit supporting wireless communication in a band of about 2.4 GHz.

The RFIC may be further configured to generate the first RF signal in an uplink band having a center frequency of about 725.5 MHz, and the wireless communication circuit may include a Global Positioning System (GPS) reception circuit configured to receive a GPS signal in a band of about 1.5 GHz.

The second condition may include: a number of transmission channel; a bandwidth of the transmission channel; and the frequency band of the first RF signal to be transmitted to the base station through the antenna in the transmission channel.

The processor may be further configured to: obtain information about a quality of the third RF signal received by the wireless communication circuit, and based on the quality being identified to be equal to or less than a reference value and the second condition being included in the control signal, adjust the frequency of the first reference signal.

The processor may be further configured to: obtain a reception signal strength of the second RF signal received from the base station through the antenna using the RFIC, based on the reception signal strength, configure power of the first RF signal to be transmitted to the base station through the antenna, and based on the power being configured to be greater than or equal to a threshold value and the second condition being included in the control signal, adjust the frequency of the first reference signal.

The processor may include a communication processor constituting a cellular communication circuit together with the RFIC.

The RFIC may include a filter configured to filter an analog signal in a specified first baseband from an analog signal received from the processor and output the filtered analog signal, and the processor may be further configured to adjust the first baseband to pass through the filter by a value by which the frequency of the first reference signal is adjusted.

According to an aspect of the disclosure, an electronic device includes: a plurality of antennas; a radio frequency integrated circuit (RFIC) configured to: generate a first radio frequency (RF) signal in a frequency band to be used in cellular communication by mixing a first baseband signal with a first reference signal, output the first RF signal to a first antenna among the plurality of antennas, receive, from the first antenna, a second RF signal in a frequency band to be used in the cellular communication, generate a second baseband signal by mixing the second RF signal with a second reference signal, and output the second baseband signal; a wireless communication circuit configured to support wireless communication other than the cellular communication; and a processor is configured to: obtain information about a quality of a third RF signal received by the wireless communication circuit through a second antenna among the plurality of antennas, based on the quality being identified to be less than or equal to a reference value, obtain, from the second baseband signal received from the RFIC, a control signal for establishing a communication channel between a base station and the electronic device, identify, from the control signal, a condition for causing desense of the third RF signal received by the wireless communication circuit through the second antenna, and based on the condition being satisfied, adjust a frequency of the first reference signal.

The RFIC may be further configured to generate the first RF signal in an uplink band having a center frequency of about 2.4 GHz, and wherein the wireless communication circuit includes a Wi-Fi communication circuit supporting wireless communication in a band of about 2.4 GHz.

The RFIC may be further configured to generate the first RF signal in an uplink band having a center frequency of about 725.5 MHz, and wherein the wireless communication circuit includes a Global Positioning System (GPS) reception circuit configured to receive a GPS signal in a band of about 1.5 GHz According to various embodiments, the electronic device may reduce desense by adjusting the frequency band of a reference signal for transmission such that the frequency band of a secondary IMD signal does not overlap the frequency band of an RX RF signal. In addition, various effects that are directly or indirectly recognized through this document may be provided.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 1 is a block diagram of an electronic device in a network environment according to various embodiments;

FIG. 2 is a block diagram of an electronic device for supporting legacy network communication and 5G network communication according to various embodiments;

FIGS. 7 and 8 are diagrams illustrating variation of a low-pass filter according to a change in the frequency of a reference signal;

DETAILED DESCRIPTION

Figure 3:
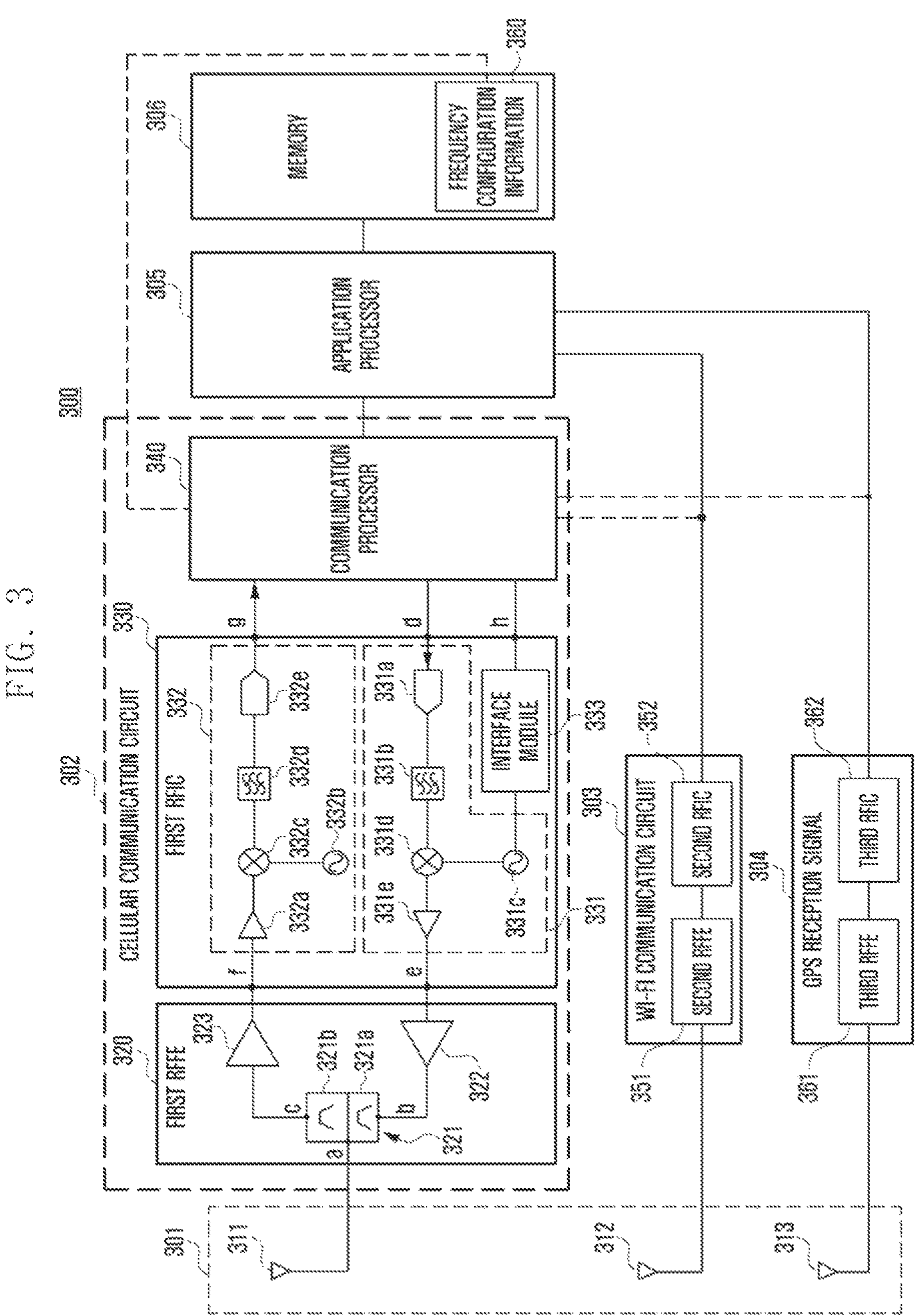
FIG. 3 is a block diagram of an electronic device configured to adjust the frequency of a reference signal used to generate an RF signal to be transmitted to a base station according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
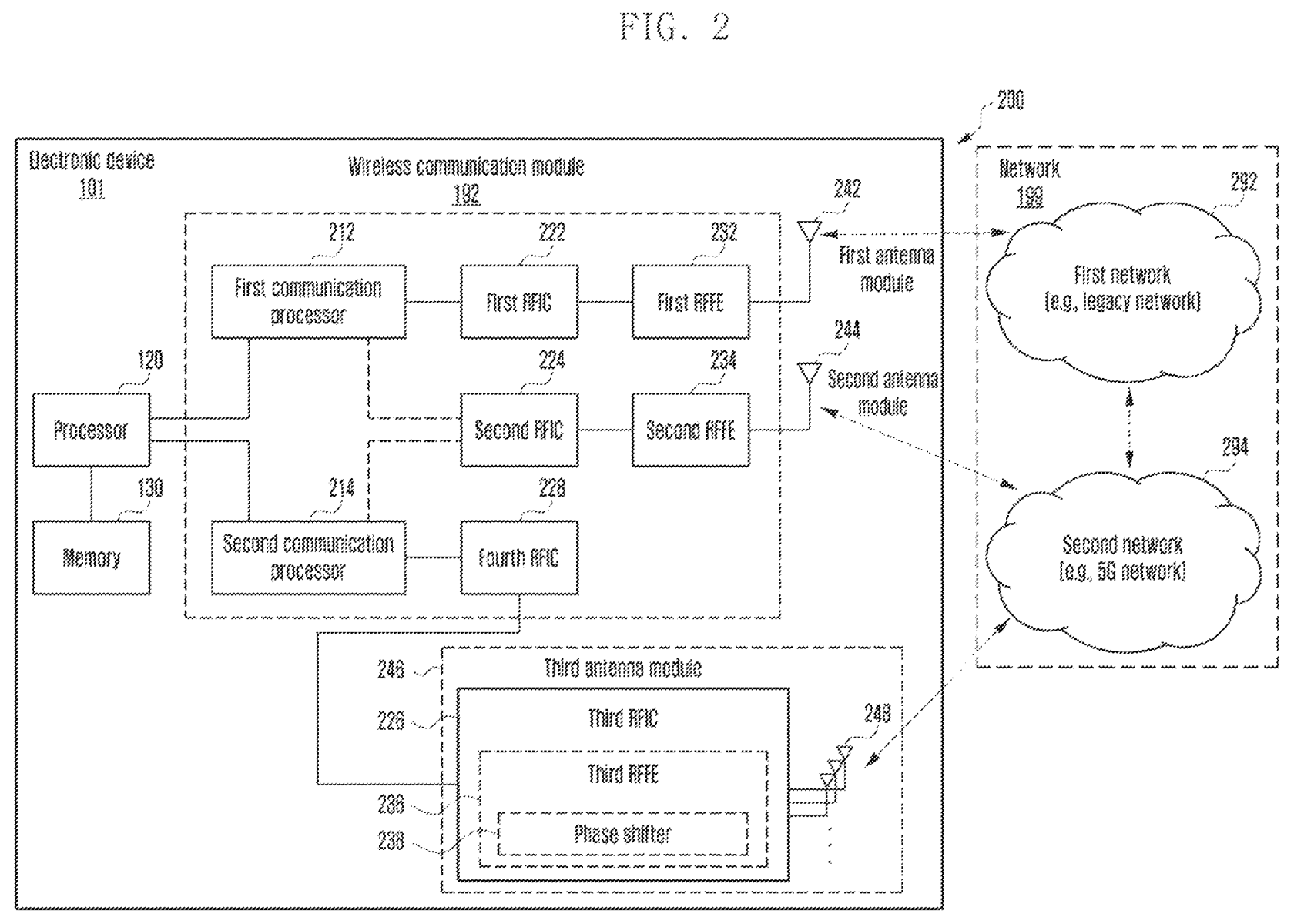

FIG. 2 is a block diagram 200 of an electronic device 101 for supporting legacy network communication and 5G network communication according to various embodiments. Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130. The network 199 may include a first network 292 and a second network 294. According to another embodiment, the electronic device 101 may further include at least one component among the components illustrated in FIG. 1, and the network 199 may further include at least one different network. According to an embodiment, the first communication processor 212, the second communication processor 214, the first RFIC 222, the second RFIC 224, the fourth RFIC 228, the first RFFE 232, and the second RFFE 234 may form at least a part of the wireless communication module 192. According to another embodiment, the fourth RFIC 228 may be omitted or included as a part of the third RFIC 226.

The first communication processor 212 may support establishment of a communication channel in a band to be used for wireless communication with the first network 292, and legacy network communication through the established communication channel. According to various embodiments, the first network may be a legacy network including a 2G, 3G, 4G, or long term evolution (LTE) network. The second communication processor 214 may support establishment of a communication channel corresponding to a designated band (for example, about 6 GHz to about 60 GHz) among bands to be used for wireless communication with the second network 294, and 5G network communication through the established communication channel. According to various embodiments, the second network 294 may be a 5G network defined by third generation partnership project (3GPP). Additionally, according to an embodiment, the first communication processor 212 or the second communication processor 214 may support establishment of a communication channel corresponding to another designated band (for example, about 6 GHz or lower) among the bands to be used for wireless communication with the second network 294, and 5G network communication through the established communication channel. According to an embodiment, the first communication processor 212 and the second communication processor 214 may be implemented inside a single chip or a single package. According to various embodiments, the first communication processor 212 or the second communication processor 214 may be formed inside a single chip or a single package together with a processor 120, an auxiliary processor 123, or a communication module 190.

The first RFIC 222 may convert a baseband signal generated by the first communication processor 212 into a radio frequency (RF) signal at about 700 MHz to about 3 GHz, which is used for the first network 292 (for example, legacy network), during transmission. During reception, an RF signal may be acquired from the first network 292 (for example, legacy network) through an antenna (for example, the first antenna module 242), and may be preprocessed through an RFFE (for example, the first RFFE 232). The first RFIC 222 may convert the preprocessed RF signal into a baseband signal such that the same can be processed by the first communication processor 212.

The second RFIC 224 may convert a baseband signal generated by the first communication processor 212 or the second communication processor 214 into an RF signal in a Sub6 band (for example, about 6 GHz or lower) (hereinafter, referred to as a 5G Sub6 RF signal) that is used for the second network 294 (for example, 5G network). During reception, a 5G Sub6 RF signal may be acquired from the second network 294 (for example, 5G network) through an antenna (for example, the second antenna module 244), and may be preprocessed through an RFFE (for example, the second RFFE 234). The second RFIC 224 may convert the preprocessed 5G Sub6 RF signal into a baseband signal such that the same can be processed by a communication processor corresponding to the first communication processor 212 or the second communication processor 214.

The third RFIC 226 may convert a baseband signal generated by the second communication processor 214 into an RF signal in a 5G Above6 band (for example, about 6 GHz to about 60 GHz) (hereinafter, referred to as a 5G Above6 signal) that is to be used for the second network 294 (for example, 5G network). During reception, a 5G Above6 RF signal may be acquired from the second network 294 (for example, 5G network) through an antenna (for example, the antenna 248), and may be preprocessed through the third RFFE 236. The third RFIC 226 may convert the preprocessed 5G Above6 signal into a baseband signal such that the same can be processed by the second communication processor 214. According to an embodiment, the third RFFE 236 may be formed as a part of the third RFIC 226.

According to an embodiment, the electronic device 101 may include a fourth RFIC 228 separately from the third RFIC 226 or as at least a part thereof. In this case, the fourth RFIC 228 may convert a baseband signal generated by the second communication processor 214 into an RF signal in an intermediate frequency band (for example, about 9 GHz to about 11 GHz) (hereinafter, referred to as an IF signal) and then deliver the IF signal to the third RFIC 226. The third RFIC 226 may convert the IF signal into a 5G Above6 RF signal. During reception, a 5G Above6 RF signal may be received from the second network 294 (for example, 5G network) through an antenna (for example, antenna 248) and converted into an IF signal by the third RFIC 226. The fourth RFIC 228 may convert the IF signal into a baseband signal such that the same can be processed by the second communication processor 214.

According to an embodiment, the first RFIC 222 and the second RFIC 224 may be implemented as at least a part of a single chip or a single package. According to an embodiment, the first RFFE 232 and the second RFFE 234 may be implemented as at least a part of a single chip or a single package. According to an embodiment, at least one antenna module of the first antenna module 242 or the second antenna module 244 may be omitted or coupled to another antenna module so as to process RF signal in multiple corresponding bands.

According to an embodiment, the third RFIC 226 and the antenna 248 may be arranged on the same substrate so as to form a third antenna module 246. For example, the wireless communication module 192 or the processor 120 may be arranged on a first substrate (for example, main PCB). In this case, the third RFIC 226 may be formed on a partial area (for example, lower surface) of a second substrate (for example, sub PCB) that is separate from the first substrate, and the antenna 248 may be arranged in another partial area (for example, upper surface), thereby forming a third antenna module 246. The third RFIC 226 and the antenna 248 may be arranged on the same substrate such that the length of the transmission line between the same can be reduced. This may reduce loss (for example, attenuation) of a signal in a high-frequency band (for example, about 6 GHz to about 60 GHz) used for 5G network communication, for example, due to the transmission line. Accordingly, the electronic device 101 may improve the quality or speed of communication with the second network 294 (for example, 5G network).

According to an embodiment, the antenna 248 may be formed as an antenna array including multiple antenna elements that may be used for beamforming. In this case, the third RFIC 226 may include multiple phase shifters 238 corresponding to the multiple antenna elements, as a part of the third RFFE 236, for example. During transmission, each of the multiple phase shifters 238 may shift the phase of a 5G Above6 RF signal, which is to be transmitted to the outside (for example, base station of 5G network) of the electronic device 101, through a corresponding antenna element. During reception, each of the multiple phase shifters 238 may shift the phase of a 5G Above6 RF signal received from the outside into the same or substantially same phase through a corresponding antenna element. This enables transmission or reception through beamforming between the electronic device 101 and the outside.

The second network 294 (for example, 5G network) may be operated independently of the first network 292 (for example, legacy network) (for example, standalone (SA)), or operated while being connected thereto (for example, non-standalone (NSA)). For example, the 5G network may include only an access network (for example, 5G radio access network (RAN) or next-generation network (NG RAN)) and include no core network (for example, next-generation core (NGC)). In this case, the electronic device 101 may access the access network of the 5G network and then access an external network (for example, Internet) under the control of the core network (for example, evolved packed core (EPC)) of the legacy network. Protocol information (for example, LTE protocol network) for communication with the legacy network or protocol information (for example, new radio (NR) protocol information) for communication with the 5G network may be stored in the memory 230, and may be accessed by another component (for example, the processor 120, the first communication processor 212, or the second communication processor 214).

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 4:
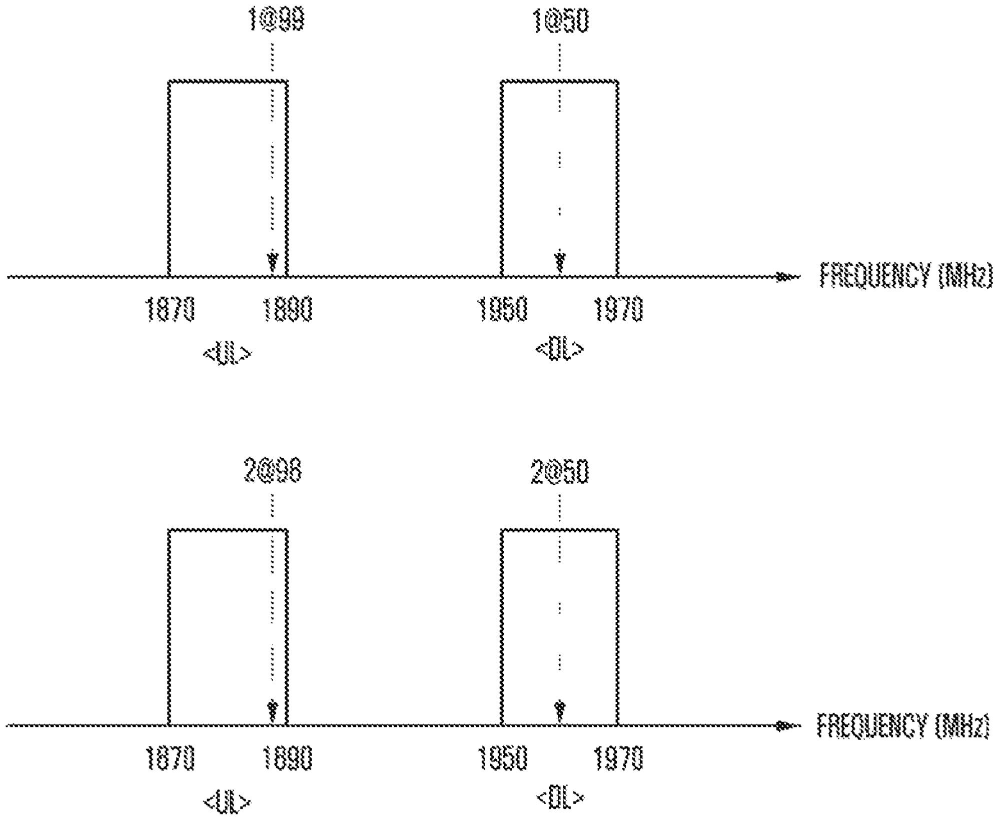
FIGS. 4, 5, and 6 are diagrams illustrating a situation in which the frequency of a reference signal is to be adjusted and technical effects resulting from adjustment of the frequency band of the reference signal.
Figure 5:
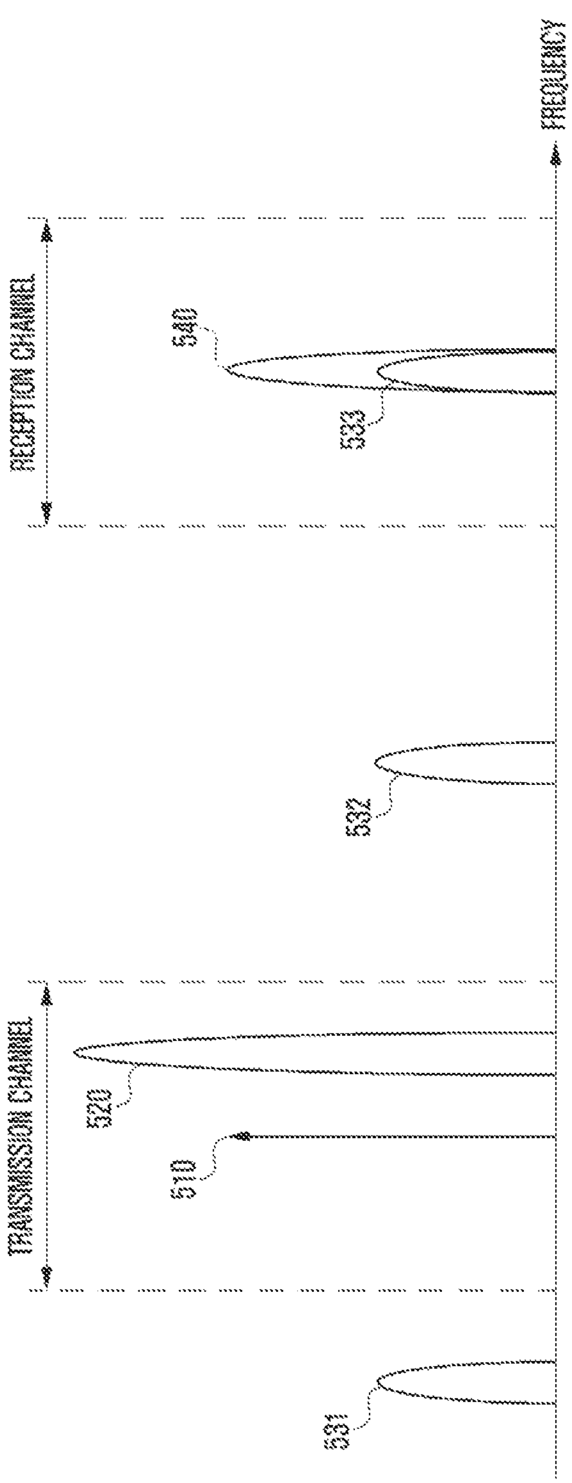
Figure 6:
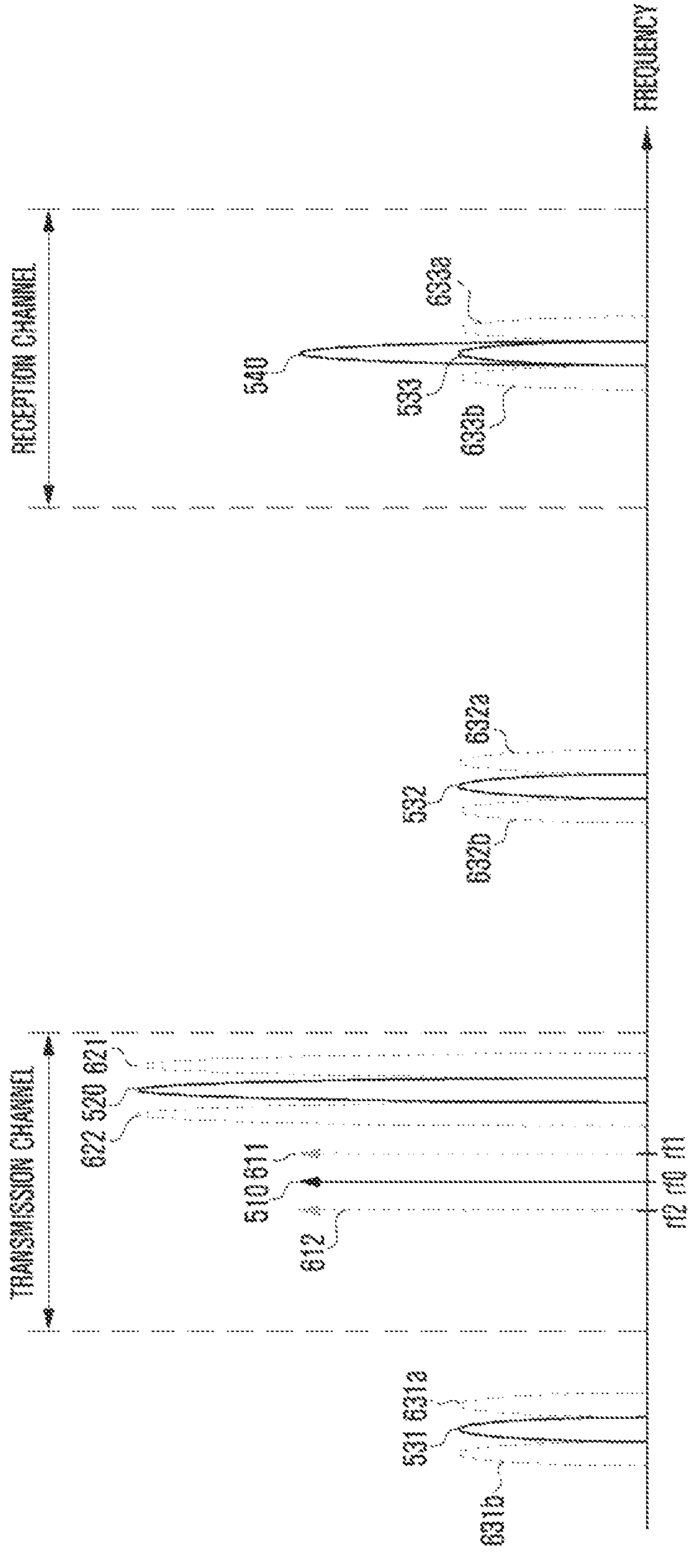
Figure 8:
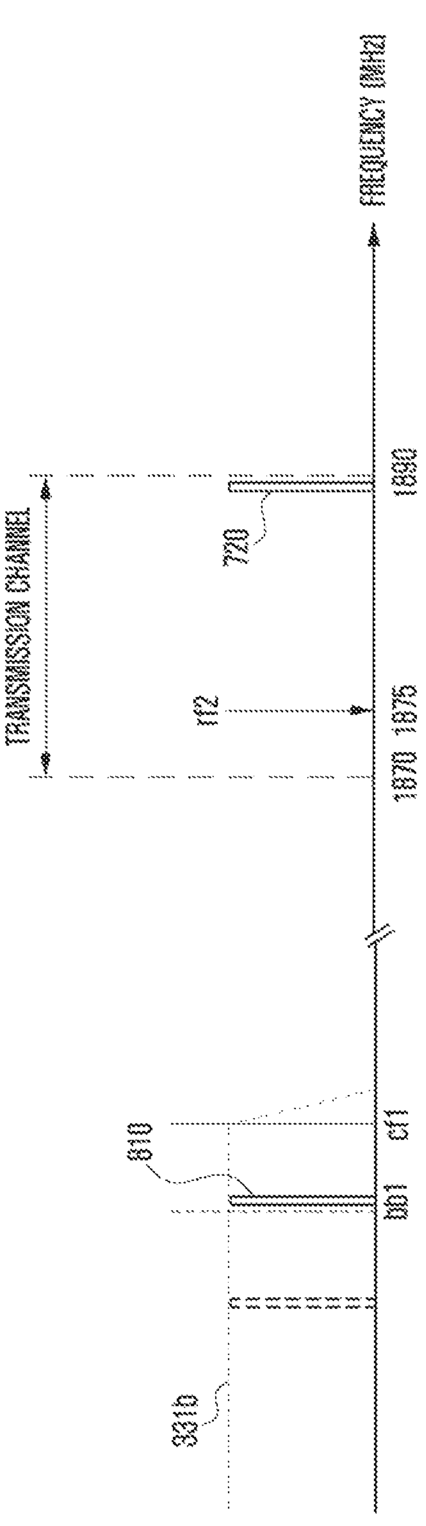

FIG. 3 is a block diagram of an electronic device 300 configured to adjust the frequency of a reference signal used to generate an RF signal to be transmitted to a base station according to various embodiments. FIGS. 4, 5, and 6 are diagrams illustrating a situation in which the frequency of a reference signal is to be adjusted and technical effects resulting from adjustment of the frequency band of the reference signal. FIGS. 7 and 8 are diagrams illustrating variation of a low-pass filter according to a change in the frequency of a reference signal.

Referring to FIG. 3, an electronic device 300 (e.g., the electronic device 101 in FIG. 1) may include an antenna module 301, a cellular communication circuit 302, a Wi-Fi communication circuit 303, a Global Positioning System (GPS) communication circuit 304, an application processor 305, and/or a memory 306. The memory 306 may store frequency configuration information 360 used to adjust the frequency band of a reference signal. In some embodiments, the Wi-Fi communication circuit 303 and/or the GPS communication circuit 304 may be omitted from the electronic device 300. Hereinafter, the prefix term indicating a sequence, such as "first", "second", and "third" are merely intended to distinguish between the elements having the same name, and are not given special meanings per se.

According to an embodiment, the antenna module 301 may include a plurality of antennas 311, 312, and 313. The first antenna 311 may be connected to the cellular communication circuit 302, and transmit and receive an RF signal in a specified frequency band so as to be used in cellular communication. The second antenna 312 may be connected to the Wi-Fi communication circuit 303, and transmit and receive an RF signal in a specified frequency band to be used in Wi-Fi communication. The third antenna 313 may receive a GPS signal and output the GPS signal to the GPS reception circuit 304. In an embodiment, the cellular communication circuit 302 may include a first RFFE 320, a first RFIC 330, and/or a communication processor 340. In an embodiment, the Wi-Fi communication circuit 303 may include a second RFFE 351 and a second RFIC 352. The second RFFE 351 may be configured to pre-process (e.g., amplification of a signal) an RF signal in a specified frequency band to be used in Wi-Fi communication. During transmission, the second RFIC 352 may convert a baseband signal (or a data signal) received from the application processor 305 into an RF signal, and output the RF signal to the second RFFE 351. During reception, the second RFIC 352 may convert an RF signal received from the second RFFE 351 into a baseband signal (or a data signal) and output the same to the application processor 305. In an embodiment, the GPS communication circuit 304 may include a third RFFE 361 and a third RFIC 362. The third RFFE 361 may be configured to pre-process (e.g., amplification of a signal) a GPS signal received from the GPS through the third antenna 313. The third RFIC 362 may be configured to convert the GPS signal into a baseband signal (or a data signal) and output the same to the application processor 305.

According to an embodiment, the first RFFE 320 (e.g., the first RFFE 232, the second RFFE 234, or the third RFFE 236 in FIG. 2) may be configured to pre-process an RF signal in a specified first frequency band to be used in cellular communication. In an embodiment, the first RFFE 320 may include a duplexer 321, a PA (power amplifier) 322, and/or an LNA (low noise amplifier) 323.

According to an embodiment, the duplexer 321 may include a first band pass filter (BPF) **321*a* for outputting an RF signal in a specified transmission frequency band to be used in data transmission to a network, a second BPF 321*b* for outputting an RF signal in a specified reception frequency band to be used in data reception from a network, a first port (a) connected to the first antenna 311, a second port (b) connected to the PA 322, and a third port (c) connected to the LNA 323. The first BPF 321*a* may be configured to filter an RF signal in a transmission frequency band from the signal received from the PA 322 through the second port (b) and output the filtered the signal to the first antenna 311 through the first port (a). The second BPF 321*b* may be configured to filter an RF signal in a reception frequency band from the signal received from the first antenna 311 through the first port (a) and output the filtered signal to the LNA 323 through the third port (c). The first BPF 321*a*, for example, may include a surface acoustic wave (SAW) filter configured to output an RF signal in a transmission frequency band. The second BPF 321*b***, for example, may include a SAW filter configured to output an RF signal in a reception frequency band.

According to an embodiment, the PA 322 may be disposed on the path between the first BPF **321*a* and the first RFIC 330, receive an RF signal from the first RFIC 330, amplify the received RF signal, and output the amplified RF signal to the first antenna 311 through the first BPF 321***a*.

According to an embodiment, the LNA 323 may be disposed on the path between the second BPF 321*b* and the first RFIC 330, amplify an RF signal received from the first antenna 311 through the second BPF 321*b*, and output the amplified RF signal to the first RFIC 330.

According to an embodiment, the transmission frequency band in the first frequency band may include an uplink band in one frequency band among the specified frequency bands to be used in a FDD (frequency division duplexing) communication scheme in the 5G or legacy network (e.g., the second network 199 in FIG. 1) defined in the 3GPP. The reception frequency band in the first frequency band may include a downlink band corresponding to the uplink band. For example, if the first frequency band includes an LTE B (band) 2, the transmission frequency band may include an uplink band (e.g., about 1850 to 1910 MHz) in the LTE Band 2. The reception frequency band may include a downlink band (e.g., about 1930 to 1990 MHz) in the LTE Band 2.

According to an embodiment, the first RFIC 330 may include a transmission circuit 331 that converts a first baseband signal received from the communication processor 340 through a first input port (d) into an RF signal into an RF signal in a transmission frequency band and output the same to the first RFFE 320 through a first output port (e), a reception circuit 332 that converts an RF signal in a reception frequency band, which is received from the first RFFE 320 through a second input port (f) into a second baseband signal and output the same to the communication processor 340 through a second output port (g), and an interface module (e.g., the MIPI (mobile industry processor interface) 333) that supports communication protocol for data communication between the transmission circuit 331 and the communication processor 340. According to an embodiment, the transmission circuit 331 may receive a control signal from the communication processor 340 through the interface module 333 and, based on the control signal, change the frequency band of a reference signal (e.g., an LO (local oscillator) signal) used when converting the first baseband signal into an RF signal in the transmission frequency band.

In an embodiment, the transmission circuit 331 may include a DAC (digital analog converter) 331*a*, a first LPF (low pass filter) 331*b*, a first local oscillator 331*c*, a first mixer 331*d*, and/or a PA 331*e*. The DAC 331*a* may convert the digital signal having data, which is received from the communication processor 340 through the first input port (d) into an analog signal. The first LPF (e.g., a SAW filter) 331*b* may filter an analog signal in a specified first baseband from the analog signal received from the DAC 331*a* and output the filtered signal. The first local oscillator 331*c* may generate a first reference signal used to convert the first baseband signal into an RF signal in a specified transmission frequency band. The first local oscillator 331*c* may adjust the frequency band of the first reference signal by the control signal received from the communication processor 340 through the interface module 333. The first mixer 331*d* may mix the first reference signal with the first baseband signal received from the DAC 331*a* through the first LPF 331*b* to generate an RF signal. The PA 331*e* may amplify the RF signal received from the first mixer 331*d* and output the amplified RF signal to the PA 322 in the first RFFE 320 through the first output port (e).

In an embodiment, the reception circuit 332 may include an LNA 332*a*, a second local oscillator 332*b*, a second mixer 332*c*, a second LPF 332*d*, and/or an ADC (analog digital converter) 332*e*. The LNA 332*a* may receive an RF signal in a specified reception frequency band from the first RFFE 320 through the second input port (f), amplify the received RF signal, and output the amplified RF signal. The second local oscillator 332*b* may generate a second reference signal used to convert an RF signal into an analog signal in a specified second baseband. The second mixer 332*c* may mix the second reference signal with the RF signal received from the first RFFE 320 through the LNA 332*a* to generate an analog signal. The second LPF (e.g., a SAW filter) 332*d* may filter an analog signal in a second baseband from the analog signal received from the second mixer 332*c* and output the filtered signal. The ADC 332*e* may convert the analog signal passing through the second LPF 332*d* into a digital signal having data. The data signal converted into digital by the ADC 332*e* may be output to the communication processor 340 through the second output port (g).

According to an embodiment, the communication processor 340 (e.g., the first communication processor 212 and the second communication processor 214 in FIG. 2) may adjust, through communication with the first RFIC 330, the frequency of a reference signal used to generate an RF signal to be output from the cellular communication circuit 302 to the first antenna 311. The situations in which the frequency of the reference signal must be adjusted and the technical effects resulting from adjustment of the frequency of the reference signal will be described with reference to Tables 1 to 6 and FIGS. 4, 5, and 6.

SCS (Subcarrier spacing) may indicate the frequency spacing between subcarriers and may be about, for example, 15 KHz in LTE. Referring to Table 1, the channel bandwidth (hereinafter, a channel BW) and the RBs (resource block) in LTE Band 2 may be up to 20 MHz and 100 RBs, respectively. The RB is a minimum unit of transmission, and one RB may be 180 KHz in the case where the SCS is about 15 KHz. The number of RBs actually used may change from 1 RB to 100 RBs at the base station depending on service conditions.

TABLE 1

| LTE Band 2 | | | | | | |
|---|---|---|---|---|---|---|
| Channel BW(MHz) | 1.4 | 3 | 5 | 10 | 15 | 20 |
| RB | 6 | 15 | 25 | 50 | 75 | 100 |

The frequency of a reference signal (hereinafter, a reference frequency) to be output from the first local oscillator 331*c* may match the center of a channel BW. For example, if the center channel has a BW of 20 MHz in an uplink band of LTE Band 2 (e.g., about 1850 to 1910 MHz), the frequency band allocated to the center channel may be about 1870 to 1890 MHz, and the reference frequency may be configured as 1880 MHz, regardless of the number of RBs. If the center channel has a BW of 10 MHz, although the frequency band allocated to the center channel is about 1875 to 1885 MHz, the reference frequency may be configured as 1880 MHz without a change.

Referring to FIG. 4, according to configuration made by the base station, the cellular communication circuit 302 of the electronic device 300 may transmit an RF signal in a frequency band of 1RB@99 to the base station through the first antenna 311 and receive an RF signal in a frequency band of 1RB@50 from the base station through the first antenna 311. The cellular communication circuit 302 may transmit an RF signal in a frequency band of 2@98 to the base station through the first antenna 311 and receive an RF signal in a frequency band of 2@50 from the base station through the first antenna 311. In the above, the number positioned before "@" may be the number of RBs, and the number positioned after "@" may be a sequence in the case where the channel BW, for example, is divided by 0 to 99. For example, the transmission channel from the electronic device 330 to the base station may be a central channel (e.g., about 1870 to 1890 MHz) in which the BW is configured as 20 MHz in the uplink band of LTE Band 2. The reception channel from the base station to the electronic device 330 may be a central channel (e.g., about 1950 to 1970 MHz) in which the BW is configured as 20 MHz in the downlink band of LTE Band 2. The electronic device 300 (e.g., the communication processor 340) may receive a control signal from the base station through the first antenna 311. The control signal may include information used to establish a communication channel between the base station and the electronic device 300, such as, information for identifying the frequency band and the BW of a transmission channel, information for identifying the frequency band and the BW of a reception channel, transmission RB information expressed in the format "number@number", and reception RB information expressed in the format "number@number". The electronic device 300 may determine the bandwidth and the frequency band of an RF signal to be transmitted to the base station, based on the received control signal. In addition, the electronic device 300 may recognize, from the control signal, the bandwidth and the frequency band of an RF signal received from the base station through the first antenna 311.

Referring to FIG. 5, an IMD signal, which is a spurious wave, may be generated by a non-linear element (e.g., the mixer, the LNA, the PA, or a VGA (variable gain amplifier)) included in the cellular communication circuit 302. For example, a first reference signal 510 may be generated in the first local oscillator 331*c*. The first mixer 331*d* may combine the first reference signal 510 with a baseband signal passing through the first BPF 331*b* to generate a first RF signal 520. In the above signal processing process, the first reference signal 510 may be combined with the first RF signal 520, thereby generating undesired first IMD signal 531 and second IMD signal 532. The first IMD signal 531 and the second IMD signal 532 may be amplified by an amplifier (e.g., the PA 322) in the cellular communication circuit 302. The amplified IMD signal (e.g., the second IMD signal 532) may be combined with the first RF signal 520 to generate a third IMD signal 533. The third IMD signal 533 may be a spurious wave that overlaps, in the frequency band, at least a portion of the RF signal 540 received by the reception circuit 332. This spurious wave may cause desense of the RF signal 540.

For example, referring to Table 2 below, the frequency of a first reference signal 510 may be 1880 MHz, and the frequency of an RF signal 520 generated thereby may be 1890 MHz. The frequencies of a first IMD signal 531 and a second IMD signal 532 generated by combining the first reference signal 510 and the first RF signal 520 may 1853 MHz and 1924 MHz, respectively. The frequency of a third IMD signal 533 generated by combining the amplified second IMD signal 532 and the RF signal 520 may be 1960 MHz, which overlaps the frequency of the RF signal 540, thereby causing desense of the RF signal 540 in the cellular communication circuit 302.

TABLE 2

| Items | Frequency (Mhz) |
| --- | --- |
| First reference signal 510 | 1880 |
| RF signal 520 (transmission) | 1890 |
| First IMD signal 531 | 1853 |
| Second IMD signal 532 | 1924 |
| Third IMD signal 533 | 1960 |
| RF signal 540 (reception) | 1960 |

As the bandwidth of an RF signal received by the cellular communication circuit 302 from the base station through the first antenna 311 becomes narrower, the probability that the RF signal transmitted to the base station through the first antenna 311 interferes with the cellular communication circuit 302 may increase, and desense may be more likely to occur according thereto.

As the power of an RF signal to be transmitted from the cellular communication circuit 302 to the base station through the first antenna 311 becomes higher, the amount of power leaking into the reception circuit 332 may increase, so desense may also be likely to occur. "Sensitivity@MinPWR" in Table 3 below indicates the degree of degradation in the sensitivity of an RX RF signal in dBm, which is measured when the electronic device 300 transmits a TX RF signal to the base station with a specified minimum power. "Sensitivity@MaxPWR" indicates the degree of degradation in the sensitivity of an RX RF signal in dBm, which is measured when the electronic device 300 transmits a TX RF signal to the base station with a specified maximum power. Tests 2 and 5 show the case where the IMD signal overlaps the RX RF signal in the frequency band as shown in Table 2. Even in the case where the frequency bands overlap, if the transmission power is configured as the minimum power, the sensitivity degradation is −90 dBm or less in all tests so that desense may not occur. If the transmission power is configured as the maximum power in the case where the frequency bands overlap as described above, it can be seen that desense of −81.4 dBm, which is greater than a reference value (e.g., −90 dBm), occurs in Test 2, and that desense of −87.7 dBm occurs in Test 5.

TABLE 3

| | LTE Band 2 | | | | | | | | | | | |
| --- | --- | --- | --- | --- | --- | --- | --- | --- | --- | --- | --- | --- |
| | 20 MHz BW | | Ch. 18900 | | | | | | | | | |
| | Test # | | | | | | | | | | | |
| | Test 1 | Test 2 | Test 3 | Test 4 | Test 5 | Test 6 | Test 7 | Test 8 | Test 9 | Test 10 | Test 11 | Test 12 |
| DL RB | 1@0 | 1@50 | 1@99 | 2@0 | 2@50 | 2@98 | 6@0 | 6@46 | 6@94 | 100@0 | 100@0 | 100@0 |
| UL RB | 1@99 | 1@99 | 1@99 | 2@98 | 2@98 | 2@98 | 6@94 | 6@94 | 6@94 | 12@88 | 50@0 | 100@0 |
| Sensitivity@minPWR | −94.0 | −91.0 | −95.1 | −96.1 | −92.5 | −96.0 | −96.4 | −93.5 | −96.2 | −96.7 | −96.7 | −96.7 |
| Sensitivity@maxPWR | −92.8 | −81.4 | −93.0 | −94.0 | −87.7 | −94.2 | −94.3 | −91.3 | −94.4 | −94.4 | −95.0 | −93.9 |

Referring to FIG. 6, the cellular communication circuit 302 may increase or reduce the reference frequency by one level corresponding to a configured unit frequency value (e.g., 5 MHz) to prevent occurrence of a third IMD signal 533 overlapping the RF signal 540 in the frequency band.

In an embodiment, the cellular communication circuit 302 may change the reference frequency from rf0 to rf1 by adding the unit frequency value to rf0 configured as a default value. The cellular communication circuit 302 may change the reference frequency from rf0 to rf2 by subtracting the unit frequency value from rf0. The adjustment range of the reference frequency may be configured within a range in which the frequency of an RF signal to be transmitted to the base station does not fall outside of the frequency band of the transmission channel. For example, the communication processor 340 may transmit a control signal instructing to change the reference frequency into rf1 to the transmission circuit 331 through the interface module 333. In response to the control signal, the first local oscillator 331*c* of the transmission circuit 331 may output a second reference signal 611 having a center frequency of rf1 to the first mixer 331*d*. The first mixer 331*d* may combine the second reference signal 611 with a baseband signal passing through the first BPF 331*b* to generate a second RF signal 621 that has a higher frequency than the first RF signal 520 but falls within the frequency band of the transmission channel. The second reference signal 611 may be combined with the second RF signal 621 to generate a fourth IMD signal 631*a* and a fifth IMD signal 632*a*. The fourth IMD signal 631*a* and the fifth IMD signal 632*a* may be amplified by an amplifier, and the amplified IMD signals may be combined with the second RF signal 621 to generate a sixth IMD signal 633*a*. Although the sixth IMD signal 633*a* falls within the frequency band of the reception channel as shown, it may not overlap the frequency band of the RF signal 540 received from the reception circuit 332. As another example, the communication processor 340 may transmit a control signal instructing to change the reference frequency into rf2 to the transmission circuit 331 through the interface module 333. In response to the control signal, the first local oscillator 331*c* of the transmission circuit 331 may output a third reference signal 612 having a the center frequency of rf2 to the first mixer 331*d*. The first mixer 331*d* may combine the third reference signal 612 with a baseband signal passing through the first BPF 331*b* to generate a third RF signal 622 that has a lower frequency than the first RF signal 520 but falls within the frequency band of the transmission channel. The second reference signal 612 may be combined with the third RF signal 622 to generate a seventh IMD signal 631*b* and an eighth IMD signal 632*b*. The seventh IMD signal 631*b* and the eighth IMD signal 632*b* may be amplified by an amplifier, and the amplified IMD signals may be combined with the third RF signal 622 to generate a ninth IMD signal 633*b*. Although the ninth IMD signal 633*b* falls within the frequency band of the reception channel as shown, it may not overlap the frequency band of the RF signal 540 received by the reception circuit 332. As a result, desense of the RF signal 540 may be prevented or reduced by changing the reference frequency from rf0 to rf1 or rf2.

In an embodiment, the communication processor 340 may obtain a control signal from a data signal (or a baseband signal) received from the base station through the cellular communication circuit 302 and compare the control signal with frequency configuration information 360 (e.g., Table 4 below). The communication processor 340 may predict that an IMD signal generated in the process of generating a TX RF signal in the cellular communication circuit 302 will cause desense by the comparison between the control signal and the frequency configuration information 360. If desense is predicted to be caused, the communication processor 340 may adjust the frequency of a reference signal used to generate a TX RF signal, based on the frequency configuration information 360. The communication processor 340 may directly access the memory 206 to read the frequency configuration information 360 or read the frequency configuration information 360 from the memory 206 through the application processor 305. Describing an example with reference to Table 4, the cellular communication circuit 302 may support LTE Band 2. The communication processor 340 may identify information (e.g., an uplink band, a channel number (e.g., Earfcn (evolved absolute radio frequency channel number)), TX RB, RX RB, or BW) about the communication schedule and configuration determined by the base station from the control signal received from the base station through the cellular communication circuit 302. The communication processor 340 may identify that a condition for causing desense, which matches the identified information, exists in Table 4. Accordingly, the communication processor 340 may adjust the frequency of the reference signal, based on the reference frequency information corresponding to the condition for causing desense identified in Table 4. For example, information recorded in No. 1 in Table 4 (18900, 1RB@99, 1RB@50, and 20 MHz) may match the identified information. Accordingly, the reference frequency may be changed from 1880 MHz to 1885 MHz or 1875 MHz.

TABLE 4

| No. | Frequency band (Uplink) | Channel number (Earfcn) | TX RB | RX RB | BW | Reference | frequency |
|---|---|---|---|---|---|---|---|
| 1 | LTE Band 2 (1850-1910 MHz) | 18900 | 1 RB@99 | 1 RB@50 | 20 MHz | rf0(default) | 1880 |
| | | | | | | rf1 | 1885 |
| | | | | | | rf2 | 1875 |
| 2 | LTE Band 3 (1710-1785 MHz) | 19575 | 1 RB@99 | 1 RB@0 | 20 MHz | rf0(default) | 1747.5 |
| | | | | | | rf1 | 1752.5 |
| | | | | | | rf2 | 1742.5 |
| . . . | . . . | . . . | . . . | . . . | . . . | . . . | . . . |

In an embodiment, the communication processor 340 may measure an error rate (e.g., an SNR (signal to noise ratio), or a BLER (block error rate)) of the data signal (or the baseband signal) received from the base station through the first antenna 311. The communication processor 340 may identify that the measured error rate is equal to or greater than a specified threshold value. The threshold value may be a value used to determine whether or not desense has occurred. The occurrence of an error rate exceeding the threshold value may be understood that an IMD signal was generated in the process of generating a TX RF signal in the cellular communication circuit 302 and that the IMD signal caused desense. In response to identifying that the measured error rate is equal to or greater than the specified threshold value, the communication processor 340 may increase or reduce the reference frequency by one level corresponding to a preconfigured unit frequency value (e.g., 5 MHz).

Describing an example with reference to Table 4, the cellular communication circuit 302 may support LTE Band 3. The communication processor 340 may control the transmission circuit 331 to configure a reference frequency as a default value of rf0 (1747.5 MHz), based on the control signal (e.g., the channel number=19574) received from the base station. In this state, if a measured error rate exceeds a threshold value, the communication processor 340 may change the reference frequency to one of rf1 (1752.5 MHz) and rf2 (1742.5 MHz). If the measured error rate exceeds the threshold value even after the change, the communication processor 340 may change the reference frequency to the other one.

In an embodiment, the communication processor 340 may measure an error rate (e.g., an SNR (signal to noise ratio) or a BLER (block error rate)) of a data signal (or a baseband signal) received from the base station through the first antenna 311. If it is identified that the measured error rate is equal to or greater than a specified threshold value, the communication processor 340 may compare a control signal obtained from the data signal (or the baseband signal) received from the base station through the cellular communication circuit 302 with frequency configuration information 360 (e.g., Table 4 above). Through the comparison between the control signal and frequency configuration information 360, the communication processor 340 may determine that an IMD signal produced in the process of generating a TX RF signal in the cellular communication circuit 302 caused desense, resulting in the error rate greater than or equal to the threshold value. If it is determined that desense is caused, the communication processor 340 may adjust the frequency of a reference signal used to produce a TX RF signal, based on frequency configuration information 360.

In an embodiment, the communication processor 340 may measure the strength (e.g., RSSI) of an RF signal received from the base station through the first antenna 311 using the reception circuit 332 of the first RFIC 330 and configure power of an RF signal to be transmitted to the base station through the first antenna 311, based on the measured reception signal strength. For example, as the reception signal strength decreases, the communication processor 340 may increase the power of the RF signal to be transmitted. If the power of the RF signal to be transmitted is configured equal to or greater than a threshold value (e.g., the maximum power), the communication processor 340 may compare a control signal obtained from a data signal (or a baseband signal) received from the base station through the cellular communication circuit 302 with frequency configuration information 360 (e.g., Table 4 above). Through the comparison between the control signal and the frequency configuration information 360, the communication processor 340 may predict that an IMD signal produced in the process of generating an RF signal to be transmitted with power greater than or equal to a threshold value in the cellular communication circuit 302 will cause desense. If desense is predicted to be caused, the communication processor 340 may adjust the frequency of a reference signal used to produce a TX RF signal, based on the frequency configuration information 360.

The IMD signal produced in the process of generating a TX RF signal in the cellular communication circuit 302 may adversely affect the RF signal received by other wireless communication circuits. For example, the cellular communication circuit 302 may support LTE Band 40 (about 2300 to 2400 MHz). An IMD signal (e.g., the third IMD signal 533) caused in the process of generating a TX RF signal in the cellular communication circuit 302 may leak into the Wi-Fi communication circuit 303 through the second antenna 312. The frequency band of the IMD signal leaking into the Wi-Fi communication circuit 303 may overlap the frequency band (e.g., about 2.4 GHz) of an RF signal received by the Wi-Fi communication circuit 303 (hereinafter, a Wi-Fi signal) so that desense of the Wi-Fi signal may occur in the Wi-Fi communication circuit 303. As another example, the cellular communication circuit 302 may support LTE Band 28 (about 703 to 748 MHz). In the process of generating an RF signal by mixing a reference signal with a baseband signal in the cellular communication circuit 302, a harmonic reference signal, which is a frequency component double the frequency of the reference signal, and a harmonic RF signal, which is a frequency component double the frequency of the RF signal, may be caused. An IMD signal may be produce in the cellular communication circuit 302 by combination of the harmonic components and leak into the GPS reception circuit 304 through the third antenna 313. The frequency band of the IMD signal leaking into the GPS reception circuit 304 may overlap the frequency band (e.g., about 1.5 GHz) of an RF signal received by the GPS reception circuit 304 (hereinafter, a GPS signal) so that desense of the GPS signal may occur in the GPS reception circuit 304.

In an embodiment, the communication processor 340 may obtain a control signal from a data signal (or a baseband signal) received from the base station through the cellular communication circuit 302 and compare the control signal with frequency configuration information 360 (e.g., Table 5 or 6 below). Through the comparison between the control signal and the frequency configuration information 360, the communication processor 340 may predict that the IMD signal produced in the process of generating a TX RF signal in the cellular communication circuit 302 will cause desense in other wireless communication circuits (e.g., the Wi-Fi communication circuit 303 or the GPS reception circuit 304). If desense is predicted to be caused, the communication processor 340 may adjust the frequency of a reference signal used to generate a TX RF signal. based on the frequency configuration information 360. The communication processor 340 may directly access the memory 206 to read the frequency configuration information 360 or read the frequency configuration information 360 from the memory 206 through the application processor 305.

Describing an example with reference to Table 5, the cellular communication circuit 302 may support LTE Band 40. The Wi-Fi communication circuit 303 may support Wi-Fi communication in the 2.4 GHz band. The communication processor 340 may identify information (e.g., an uplink band, a channel number (e.g., Earfcn), TX RB, and BW) about the communication schedule and configuration determined by the base station from the control signal received from the base station through the cellular communication circuit 302. The communication processor 340 may identify that attack information (a condition for causing desense that adversely affects the victim) that matches the identified information exists in Table 5. Accordingly, the communication processor 340 may adjust the frequency of the reference signal, based on reference frequency information corresponding to the attack information identified in Table 5. For example, the attack information (39150, 1RB@99, and 20 MHz) recorded in Table 5 may match the identified information. Accordingly, the reference frequency may be changed from 2350 MHz to 2355 MHz or 2345 MHz.

TABLE 5

| Victim | Attack | | | | |
|---|---|---|---|---|---|
| | Frequency band (Uplink) | Channel number (Earfcn) | TX RB | BW | Reference frequency |
| Wi-Fi 2.4 G (2412-2472 MHz) | LTE Band 40 (2300-2400 MHz) | 39150 | 1 RB@99 | 20 MHz | rf0 2350<br>rf1 2355<br>rf2 2345 |

With reference to Table 6, in another example, the cellular communication circuit 302 may support LTE Band 28 (an uplink band of about 703 to 748 MHz). The GPS reception circuit 304 may support GPS reception in the L1 band (about 1559 to 1591 MHz). The GPS may include Galileo, Glonass, and/or Beidu, which will be collectively referred to as a GPS below. The communication processor 340 may identify information (e.g., an uplink band, a channel number (e.g., Earfcn), TX RB, and BW) about the communication schedule and configuration determined by the base station from the control signal received from the base station through the cellular communication circuit 302. The communication processor 340 may identify that attack information (a condition for causing desense that adversely affects the victim) that matches the identified information exists in Table 6. Accordingly, the communication processor 340 may adjust the frequency of the reference signal, based on reference frequency information corresponding to the attack information identified in Table 5. For example, the attack information (27635, 1RB@24, and 5 MHz) recorded in Table 6 may match the identified information. Accordingly, the reference frequency may be changed from 745.5 (=1491/2) MHz to 743 (1486/2) MHz.

TABLE 6

| Victim | Attack | | | | |
|---|---|---|---|---|---|
| | Frequency band (Uplink) | Channel number (Earfcn) | TX RB | BW | Reference frequency |
| GPS L1 (1559-1591 MHz) | LTE Band 28 (2$^{nd}$ harmonics: 1406-1496 MHz) | 27635 | 1 RB@24 | [5 MHz] | rf0 1491/2<br>rf1 1486/2 |

In an embodiment, based on the signal quality (e.g., RSSI (received signal strength indicator)) of an RF signal received by another wireless communication circuit, the communication processor 340 may adjust the frequency of a reference signal used to generate a TX RF signal in the cellular communication circuit 302. The communication processor 340 may receive information about the signal quality from the application processor 305. For example, in response to a request from the communication processor 340, the application processor 305 may analyze a data signal received from another wireless communication circuit (e.g., the Wi-Fi communication circuit 303 and the GPS reception circuit 304) to obtain information about the signal quality, and reply to the communication processor 340 with the obtained signal quality information. As another example, the communication processor 340 may be electrically connected to the Wi-Fi communication circuit 303 and/or the GPS reception circuit 304, thereby directly obtaining information about the signal quality.

Describing an example with reference to Table 5, the cellular communication circuit 302 may support LTE Band 40. The Wi-Fi communication circuit 303 may support Wi-Fi communication in a 2.4 GHz band. The communication processor 340 may identify that the signal quality of an RF signal received by the Wi-Fi communication circuit 303 through the second antenna 312 is less than or equal to a specified reference value. The reference value may be a value used to determine whether or not desense occurs. If the quality is less than or equal to the reference value, it may be understood that an IMD signal was generated in the process of generating a TX RF signal in the cellular communication circuit 302 and that the IMD signal caused desense in the Wi-Fi communication circuit 303. In response to identifying that the signal quality is less than or equal to the reference value, the communication processor 340 may change the reference frequency from 2350 MHz to 2355 MHz or 2345 MHz.

With reference to Table 6, in another example, the cellular communication circuit 302 may support LTE Band 28 (an uplink band of about 703 to 748 MHz). The GPS reception circuit 304 may support GPS reception in the L1 band (about 1559 to 1591 MHz). The communication processor 340 may identify that the signal quality of an RF signal received by the GPS reception circuit 304 through the third antenna 313 is less than or equal to a specified reference value. In response to identifying that the signal quality is less than or equal to a reference value, the communication processor 340 may change the reference frequency from 729.5 (=1459/2) MHz to 750 (=1500/2) MHz or 745 (=1490/2) MHz.

In an embodiment, the communication processor 340 may obtain information about the signal quality of an RF signal received by another wireless communication circuit (e.g., the Wi-Fi communication circuit 303 or the GPS reception circuit 304). If it is identified that the obtained signal quality is less than or equal to a specified reference value, the communication processor 340 may compare a control signal obtained from a data signal (or a baseband signal) received from the base station through the cellular communication circuit 302 with frequency configuration information 360. If the signal quality less than or equal to a reference value relates to a Wi-Fi signal, the target to be compared with the control signal may be the attack information in Table 5. If the signal quality less than or equal to a reference value relates to a GPS signal, the target to be compared with the control signal may be the attack information in Table 6. Through the comparison between the control signal and the frequency configuration information 360, the communication processor 340 may determine that the IMD signal produce in the process of generating a TX RF signal in the cellular communication circuit 302 caused desense in another communication circuit (e.g., the Wi-Fi communication circuit 303 or the GPS reception circuit 304), thereby degrading the signal quality below the reference value. If the desense is determined to be caused, the communication processor 340 may adjust the frequency of a reference signal used to generate a TX RF signal in the cellular communication circuit 302, based on the frequency configuration information 360.

In an embodiment, the communication processor 340 may measure the strength (e.g., RSSI) of an RF signal received from the base station through the first antenna 311 using the reception circuit 332 of the first RFIC 330 and, based on the measured reception signal strength, determine power of an RF signal to be transmitted to the base station through the first antenna 311. For example, the communication processor 340 may increase the power of the RF signal to be transmitted as the reception signal strength decreases. If the power of the RF signal to be transmitted is configured to be greater than or equal to a threshold value (e.g., a maximum power value), the communication processor 340 may compare the control signal obtained from a data signal (or a baseband signal) received from the base station through the cellular communication circuit 302 with frequency configuration information 360 (e.g., Table 5 or Table 6). Through the comparison between the control signal and the frequency configuration information 360, the communication processor 340 may predict that the IMD signal produce in the process of generating a TX RF signal in the cellular communication circuit 302 will cause desense in another communication circuit (e.g., the Wi-Fi communication circuit 303 or the GPS reception circuit 304). If the desense is predicted to be caused, the communication processor 340 may adjust the frequency of a reference signal used to generate a TX RF signal in the cellular communication circuit 302, based on the frequency configuration information 360.

Referring to FIGS. 7 and 8, the first LPF **331*b* may be implemented as a variable low-pass filter that varies a cut-off frequency corresponding to adjustment of a reference frequency. For example, the frequency band of a transmission channel may be configured as 1870 to 1880 MHz, and the frequency of a reference signal used to generate an RF signal to be transmitted to the base station may be configured as 1880 MHz (rf0). The cut-off frequency of the first LPF 331*b* may be configured as cf0 higher than the frequency bb0 of a baseband signal. A first baseband signal 710 may pass through the first LPF 331*b* without loss of data to be transmitted to the base station and may be combined with the reference signal by the first mixer 331*d* to be converted into an RF signal 720. According to the embodiment described above with reference to FIGS. 3 to 6, the frequency of a reference signal may be converted to 1875 MHz (rf2). The cut-off frequency of the first LPF 331*b* and the frequency of the baseband signal having data may be adjusted by a changed bandwidth (rf0-rf2) of the reference frequency by the communication processor 340 so that the frequency of the RF signal 720 does not change even if the reference frequency is changed. For example, the cut-off frequency may increase from cf0 to cf1 by the bandwidth (rf0-rf2). The frequency of the baseband signal may increase from bb0 to bb1 by the bandwidth (rf0-rf2). Accordingly, the second baseband signal 810 may pass through the first LPF 331*b* without data loss and may be combined with a reference signal by the first mixer 331*d* to be converted into an RF signal 720**.

In the description of FIGS. 9 to 16 below, the content that has already been described with reference to FIGS. 3 to 6 will be omitted or briefly described.

Figure 9:
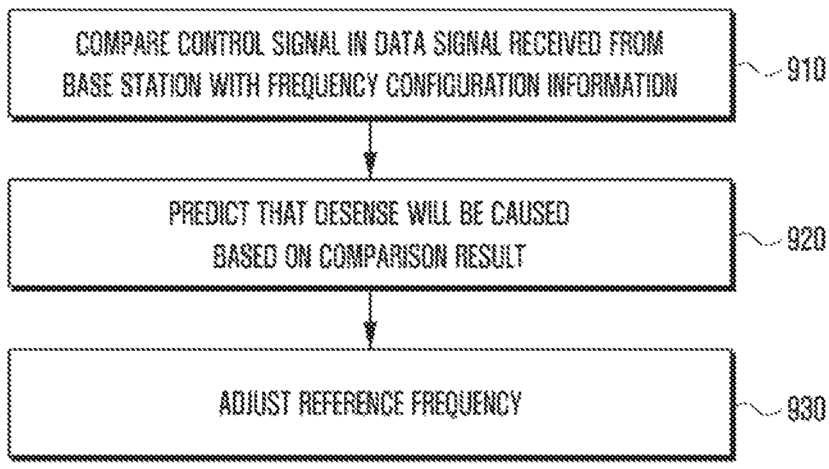
FIG. 9 is a flowchart illustrating operations performed by a communication processor of an electronic device in order to reduce desense according to an embodiment.

FIG. 9 is a flowchart illustrating operations performed by a communication processor 340 of an electronic device 300 in order to reduce desense according to an embodiment.

In operation 910, the communication processor 340 may compare a control signal in a data signal received from the base station through the first RFIC 330 with frequency configuration information 360 (e.g., Table 4).

In operation 920, the communication processor 340, based on the comparison result, may predict that an RF signal generated in the cellular communication circuit 302 and transmitted to the base station through the first antenna 311 will cause desense of an RF signal received from the base station through the first antenna 311.

In operation 930, the communication processor 340 may adjust the reference frequency, based on the frequency configuration information 360. For example, if the cellular communication circuit 302 supports LTE Band 3 and if the control signal matches the information recorded in No. 3 of Table 4, the reference frequency may be changed from 1747.5 MHz (rf0) to 1752.5 MHz (rf1) or 1742.5 MHz (rf2).

Figure 10:
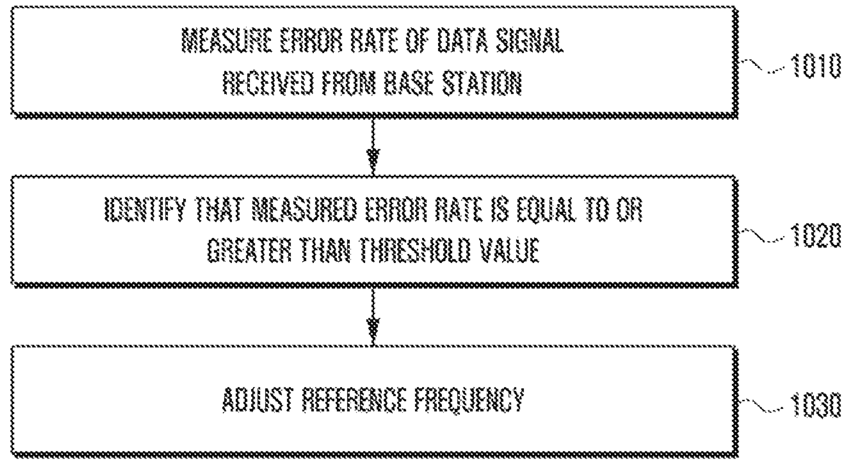
FIG. 10 is a flowchart illustrating operations performed by a communication processor of an electronic device in order to reduce desense according to an embodiment.

FIG. 10 is a flowchart illustrating operations performed by a communication processor 340 of an electronic device 300 in order to reduce desense according to an embodiment.

In operation 1010, the communication processor 340 may measure an error rate (e.g., an SNR or a BLER) of a data signal received from the base station through the first RFIC 330.

In operation 1020, the communication processor 340 may identify that the measured error rate is equal to or greater than a threshold value.

If the measured error rate is determined to be equal to or greater than a threshold value, in operation 1030, the communication processor 340 may adjust the reference frequency, based on the frequency configuration information 360. For example, if the cellular communication circuit 302 supports LTE Band 3, the communication processor 340 may configure the reference frequency as 1747.5 MHz (rf0). If the measured error rate is identified to be greater than or equal to the threshold value, the communication processor 340 may change the reference frequency from 1747.5 MHz (rf0) to 1752.5 MHz (rf1) or 1742.5 MHz (rf2).

Figure 11:
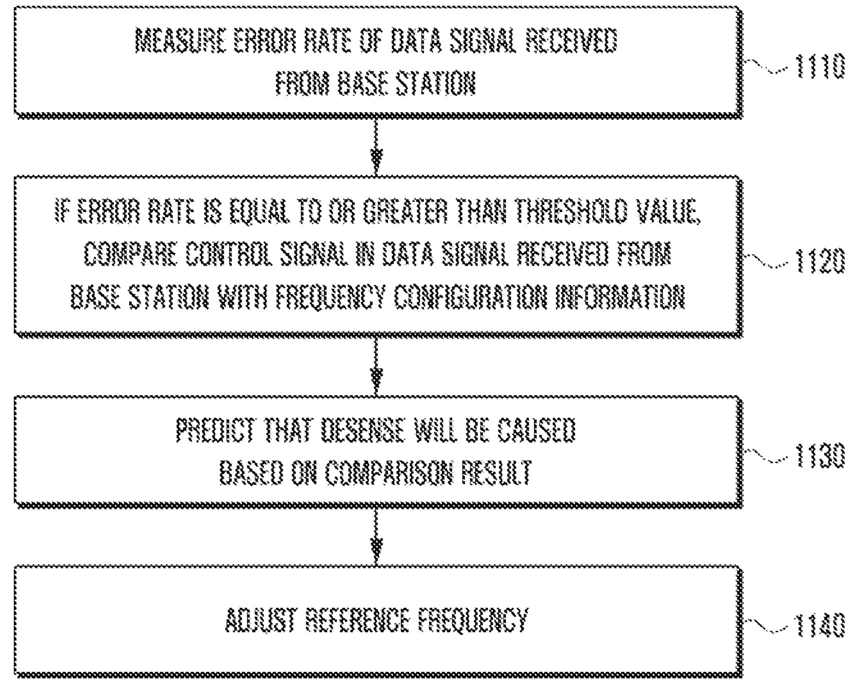
FIG. 11 is a flowchart illustrating operations performed by a communication processor of an electronic device in order to reduce desense according to an embodiment.

FIG. 11 is a flowchart illustrating operations performed by a communication processor 340 of an electronic device 300 in order to reduce desense according to an embodiment.

In operation 1110, the communication processor 340 may measure an error rate (e.g., an SNR or a BLER) of a data signal received from the base station through the first RFIC 330.

In operation 1120, if the error rate is equal to or greater than a threshold value, the communication processor 340 may compare the control signal in a data signal received from the base station through the first RFIC 330 with frequency configuration information 360 (e.g., Table 4).

In operation 1130, based on the comparison result, the communication processor 340 may determine that an RF signal generated in the cellular communication circuit 302 and transmitted to the base station through the first antenna 311 caused desense of an RF signal received from the base station through the first antenna 311.

In operation 1140, the communication processor 340 may adjust the reference frequency, based on the frequency configuration information 360. For example, if the cellular communication circuit 302 supports LTE Band 2 and if the control signal matches the information recorded in No. 2 of Table 4, the reference frequency may be changed from 1880 MHz (rf0) to 1885 MHz (rf1) or 1875 MHz (rf2).

Figure 12:
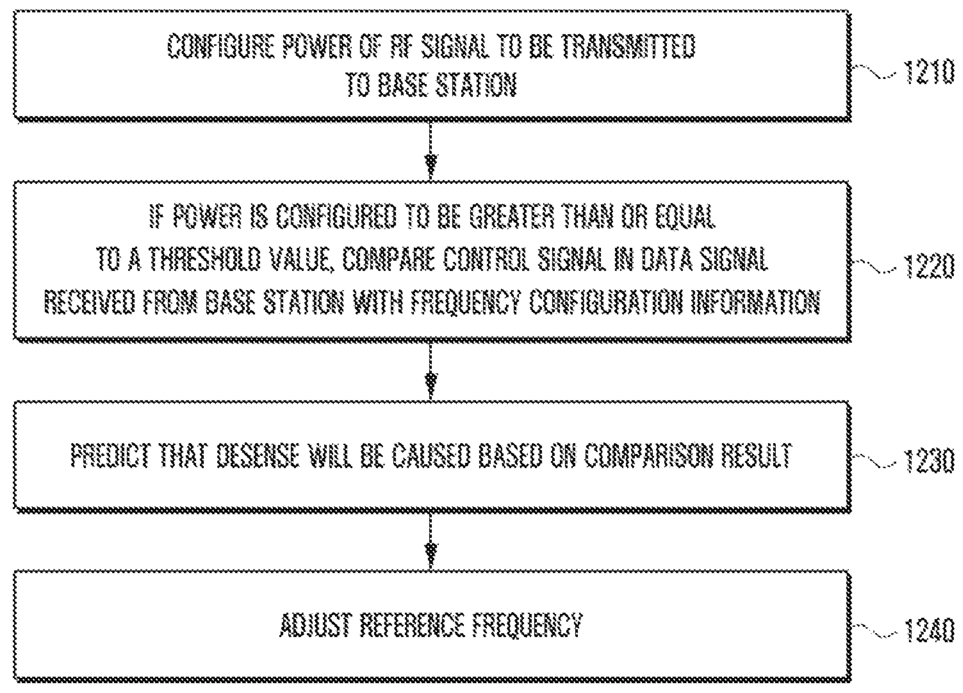
FIG. 12 is a flowchart illustrating operations performed by a communication processor of an electronic device in order to reduce desense according to an embodiment.

FIG. 12 is a flowchart illustrating operations performed by a communication processor 340 of an electronic device 300 in order to reduce desense according to an embodiment.

In operation 1210, the communication processor 340 may configure power of an RF signal to be transmitted to the base station through the first antenna 311, based on the reception signal strength (e.g., RSSI) measured through the reception circuit 332 of the first RFIC 330.

In operation 1220, if the power is configured to be greater than or equal to a threshold value, the communication processor 340 may compare the control signal in a data signal received from the base station through the first RFIC 330 with frequency configuration information 360 (e.g., Table 4).

In operation 1230, based on the comparison result, the communication processor 340 may predict that an RF signal generated in the cellular communication circuit 302 and transmitted to the base station through the first antenna 311 will cause desense of an RF signal received from the base station through the first antenna 311.

In operation 1240, the communication processor 340 may adjust the reference frequency, based on the frequency configuration information 360. For example, if the cellular communication circuit 302 supports LTE Band 2 and if the control signal matches the information recorded in No. 1 of Table 4, the reference frequency may be changed from 1880 MHz (rf0) to 1885 MHz (rf1) or 1875 MHz (rf2).

Figure 13:
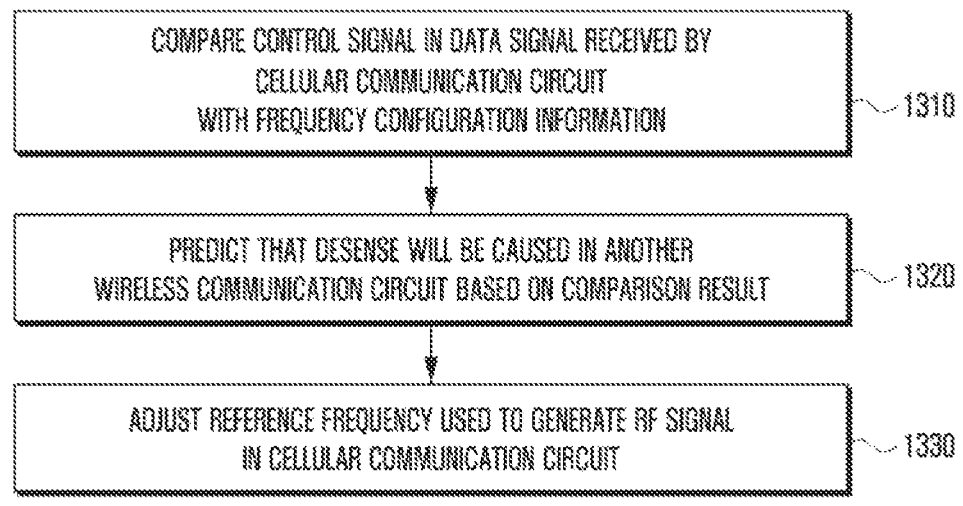
FIG. 13 is a flowchart illustrating operations performed by a communication processor of an electronic device in order to reduce desense according to an embodiment.

FIG. 13 is a flowchart illustrating operations performed by a communication processor 340 of an electronic device 300 in order to reduce desense according to an embodiment.

In operation 1310, the communication processor 340 may compare the control signal obtained from a data signal received by the cellular communication circuit 302 from the base station through the first antenna 311 with frequency configuration information 360 (e.g., Table 5 or Table 6).

In operation 1320, the communication processor 340 may predict that desense will be caused in another wireless communication circuit, based on the comparison result. For example, if the cellular communication circuit 302 supports LTE Band 40 and if the Wi-Fi communication circuit 303 supports Wi-Fi communication in a 2.4 GHz band, the target to be compared with the control signal may be the attack information in Table 5. If the control signal matches the attack information in Table 5, the communication processor 340 may predict that desense will be caused in the Wi-Fi communication circuit 303. As another example, if the cellular communication circuit 302 supports LTE Band 28 (an uplink band of about 703 to 748 MHz) and if the GPS reception circuit 304 supports GPS reception in the L1 band (about 1559 to 1591 MHz), the target to be compared with the control signal may be the attack information in Table 6. If the control signal matches the attack information in Table 6, the communication processor 340 may predict that desense will be caused in the GPS reception circuit 304.

In operation 1330, the communication processor 340 may adjust the frequency of a reference signal used to generate an RF signal in the cellular communication circuit 302, based on the frequency configuration information 360. For example, if the control signal matches the attack information in Table 5, the reference frequency may be changed from 2350 MHz (rf0) to 2355 MHz (rf1) or 2345 MHz (rf2). If the control signal matches the attack information in Table 6, the reference frequency can be changed from 729.5 (=1459/2) MHz to 750 (=1500/2) MHz or 745 (=1490/2) MHz.

Figure 14:
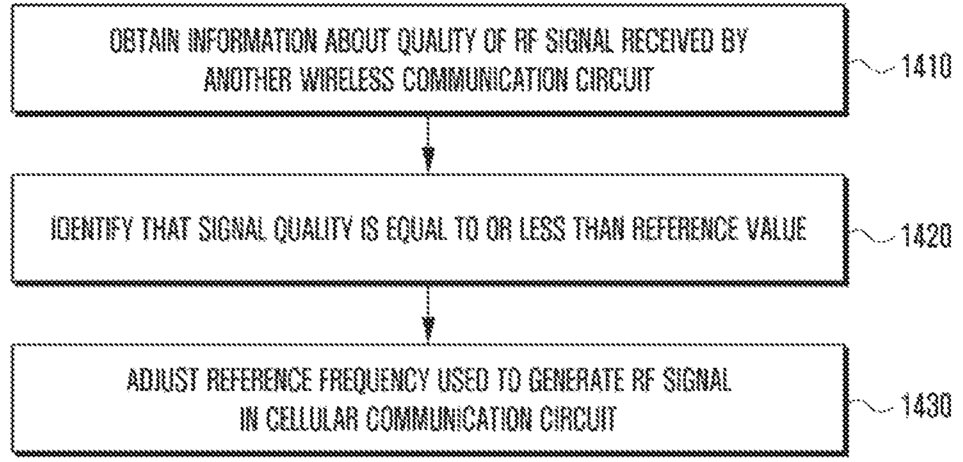
FIG. 14 is a flowchart illustrating operations performed by a communication processor of an electronic device in order to reduce desense according to an embodiment.

FIG. 14 is a flowchart illustrating operations performed by a communication processor 340 of an electronic device 300 in order to reduce desense according to an embodiment.

In operation 1410, the communication processor 340 may obtain information about the quality of an RF signal received by another wireless communication circuit. For example, the communication processor 340 may receive, from the application processor 305, information about the quality of an RF signal received through the Wi-Fi communication circuit 303 and/or information about the quality of an RF signal received through the GPS reception circuit 304. As another example, the communication processor 340 may receive a data signal from the Wi-Fi communication circuit 303 and analyze the same to obtain signal quality. In addition, the communication processor 340 may receive a data signal from the GPS reception circuit 304 and analyze the same to obtain signal quality.

In operation 1420, the communication processor 340 may identify that the signal quality is equal to or less than a reference value.

In operation 1430, the communication processor 340 may adjust the frequency of a reference signal used to generate an RF signal in the cellular communication circuit 302, based on the frequency configuration information 360 (e.g., Table 5 and Table 6). For example, if the cellular communication circuit 302 supports LTE Band 40 and if the Wi-Fi communication circuit 303 supports Wi-Fi communication in a 2.4 GHz band, the reference frequency may be changed from 2350 MHz (rf0) to 2355 MHz (rf1) or 2345 MHz (rf2). As another example, if the cellular communication circuit 302 supports LTE Band 28 (an uplink band of about 703 to 748 MHz) and if the GPS reception circuit 304 supports GPS reception in the L1 band (about 1559 to 1591 MHz), the reference frequency may be changed from 729.5 (=1459/2) MHz to 750 (=1500/2) MHz or 745 (=1490/2) MHz.

Figure 15:
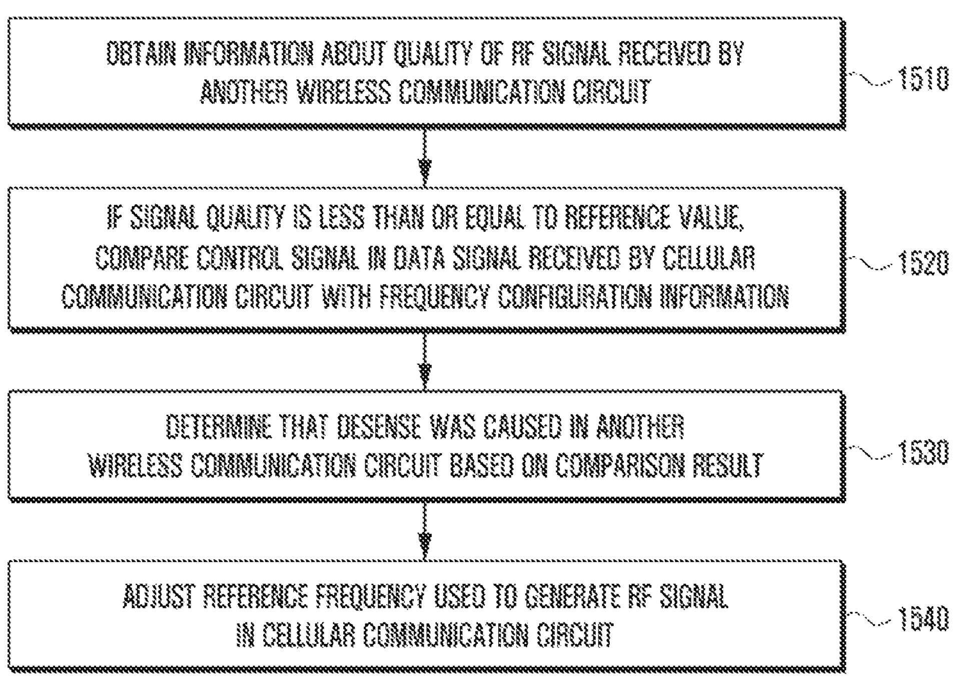
FIG. 15 is a flowchart illustrating operations performed by a communication processor of an electronic device in order to reduce desense according to an embodiment.

FIG. 15 is a flowchart illustrating operations performed by a communication processor 340 of an electronic device 300 in order to reduce desense according to an embodiment.

In operation 1510, the communication processor 340 may obtain information about the quality of an RF signal received by another wireless communication circuit (e.g., the Wi-Fi communication circuit 303 or the GPS reception circuit 304).

In operation 1520, if the signal quality is less than or equal to a reference value, the communication processor 340 may compare the control signal in a data signal received by the cellular communication circuit 302 from the base station through the first antenna 311 with frequency configuration information 360 (e.g., Table 5 or Table 6).

In operation 1530, the communication processor 340, based on the comparison result, may determine that an RF signal generated in the cellular communication circuit 302 and transmitted to the base station through the first antenna 311 caused desense of an RF signal received by another wireless communication circuit. For example, if the cellular communication circuit 302 supports LTE Band 40 and if the Wi-Fi communication circuit 303 supports Wi-Fi communication in a 2.4 GHz band, the target to be compared with the control signal may be the attack information in Table 5. If the control signal matches the attack information in Table 5, the communication processor 340 may determine that desense was caused in the Wi-Fi communication circuit 303. As another example, if the cellular communication circuit 302 supports LTE Band 28 (an uplink band of about 703 to 748 MHz) and if the GPS reception circuit 304 supports GPS reception in the L1 band (about 1559 to 1591 MHz), the target to be compared with the control signal may be the attack information in Table 6. If the control signal matches the attack information in Table 6, the communication processor 340 may determine that desense was caused in the GPS reception circuit 304.

In operation 1540, the communication processor 340 may adjust the frequency of a reference signal used to generate an RF signal in the cellular communication circuit 302, based on the frequency configuration information 360. For example, if the control signal matches the attack information in Table 5, the reference frequency may be changed from 2350 MHz (rf0) to 2355 MHz (rf1) or 2345 MHz (rf2). If the control signal matches the attack information in Table 6, the reference frequency may be changed from 729.5 (=1459/2) MHz to 750 (=1500/2) MHz or 745 (=1490/2) MHz.

Figure 16:
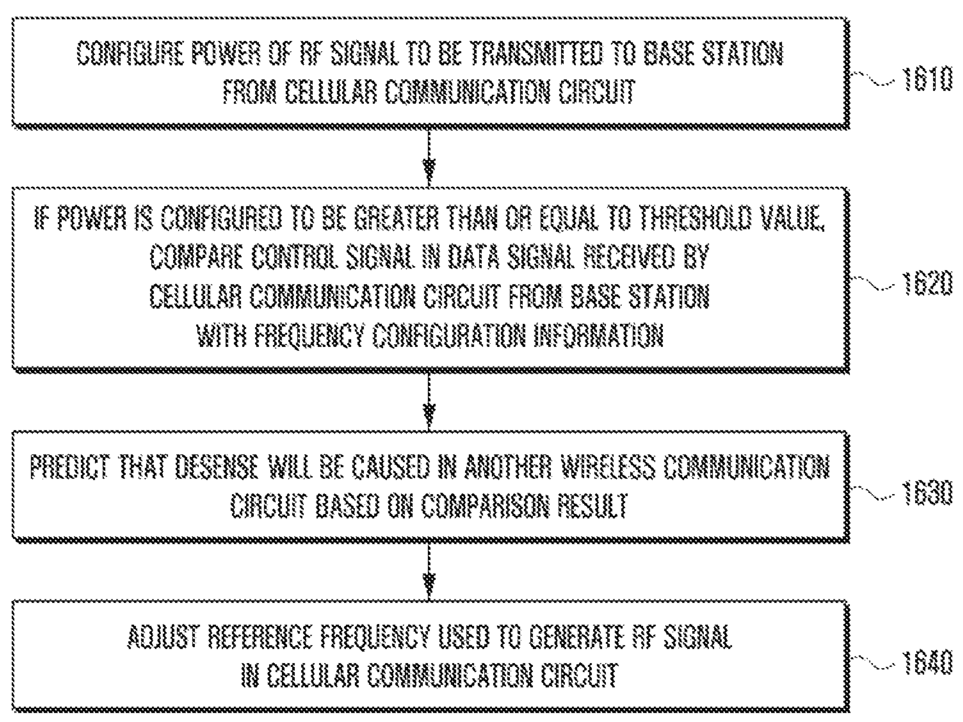
FIG. 16 is a flowchart illustrating operations performed by a communication processor of an electronic device in order to reduce desense according to an embodiment.

FIG. 16 is a flowchart illustrating operations performed by a communication processor 340 of an electronic device 300 in order to reduce desense according to an embodiment.

In operation 1610, the communication processor 340 may configure power of an RF signal to be transmitted to the base station from the transmission circuit 331 of the cellular communication circuit 302, based on the reception signal strength (e.g., RSSI) measured through the reception circuit 332 of the cellular communication circuit 302.

In operation 1620, if the power is configured to be greater than or equal to a threshold value, the communication processor 340 may compare the control signal in a data signal received by the cellular communication circuit 302 from the base station through the first antenna 311 with frequency configuration information 360 (e.g., Table 5 or Table 6).

In operation 1630, the communication processor 340 may predict that desense will be caused in another wireless communication circuit, based on the comparison result. For example, if the cellular communication circuit 302 supports LTE Band 40 and if the Wi-Fi communication circuit 303 supports Wi-Fi communication in a 2.4 GHz band, the target to be compared with the control signal may be the attack information in Table 5. If the control signal matches the attack information in Table 5, the communication processor 340 may predict that desense will be caused in the Wi-Fi communication circuit 303. As another example, if the cellular communication circuit 302 supports LTE Band 28 (an uplink band of about 703 to 748 MHz) and if the GPS reception circuit 304 supports GPS reception in the L1 band (about 1559 to 1591 MHz), the target to be compared with the control signal may be the attack information in Table 6. If the control signal matches the attack information in Table 6, the communication processor 340 may predict that desense will be caused in the GPS reception circuit 304.

In operation 1640, the communication processor 340 may adjust the frequency of a reference signal used to generate an RF signal in the cellular communication circuit 302, based on the frequency configuration information 360. For example, if the control signal matches the attack information in Table 5, the reference frequency may be changed from 2350 MHz (rf0) to 2355 MHz (rf1) or 2345 MHz (rf2). If the control signal matches the attack information in Table 6, the reference frequency may be changed from 729.5 (=1459/2) MHz to 750 (=1500/2) MHz or 745 (=1490/2) MHz.

In various embodiments, an electronic device (e.g., the electronic device 300 in FIG. 3) may include: an antenna; a processor; and an RFIC configured to generate a first RF signal in a specified frequency band to be used in cellular communication by mixing a first baseband signal received from the processor with a first reference signal, output the first RF signal to the antenna, receive, from the antenna, a second RF signal in a specified frequency band to be used in the cellular communication, generate a second baseband signal by mixing the second RF signal with a second reference signal, and output the second baseband signal to the processor. The processor (e.g., the communication processor 340 in FIG. 3) may be configured to obtain a control signal used to establish a communication channel between a base station and the electronic device from the second baseband signal received from the RFIC, identify a first condition for causing desense of the second RF signal from the control signal, and adjust a frequency of the first reference signal if the first condition is satisfied.

The processor may be configured to obtain the reception signal strength of the second RF signal received from the base station through the antenna using the RFIC, based on the reception signal strength, configure power of the first RF signal to be transmitted to the base station through the antenna, and adjust the frequency of the first reference signal if the power is configured to be greater than or equal to a threshold value and if the first condition is satisfied.

The processor may be configured to measure an error rate of the second baseband signal received from the RFIC, and adjust the frequency of the first reference signal if the measured error rate is identified to be equal to or greater than a threshold value and if the first condition is satisfied. If the value capable of being configured as the frequency of the first reference signal is a default value, a first value greater than the default value, or a second value smaller than the default value, the processor may be configured to change the frequency of the first reference signal from the default value to one of the first value and the second value if the measured error rate is identified to be equal to or greater than a threshold value and if the first condition is satisfied, and change the frequency of the reference signal to the remaining one of the first value and the second value if the measured error rate is identified to be equal to or greater than the threshold value in the state in which the frequency of the first reference signal is configured as one of the first value and the second value.

The first condition may include: a number of a transmission channel; a bandwidth of the transmission channel; a frequency band of a first RF signal to be transmitted to the base station through the antenna in the transmission channel; and a frequency band of a second RF signal received from the base station in a reception channel.

In the case where a wireless communication circuit (e.g., the Wi-Fi communication circuit 303 or the GPS reception circuit 304 in FIG. 3) configured to support wireless communication other than the cellular communication is included in the electronic device, the processor may be configured to identify that a second condition for causing desense of a third RF signal received by the wireless communication circuit from the outside is included in the control signal, and adjust the frequency of the first reference signal if the second condition is included in the control signal.

In the case where the RFIC is configured to generate a first RF signal in an uplink band having a center frequency of about 2.4 GHz, the wireless communication circuit may include a Wi-Fi communication circuit supporting wireless communication in a band of about 2.4 GHz. In the case where the RFIC is configured to generate a first RF signal in an uplink band having a center frequency of about 725.5 MHz, the wireless communication circuit may include a GPS reception circuit configured to receive a GPS signal in a band of about 1.5 GHz.

The second condition may include: a number of transmission channel; a bandwidth of the transmission channel;

and a frequency band of a first RF signal to be transmitted to the base station through the antenna in the transmission channel.

The processor may be configured to obtain information about the quality of the third RF signal received by the wireless communication circuit, and adjust the frequency of the first reference signal if the quality is identified to be equal to or less than a reference value and if the second condition is included in the control signal.

The processor may be configured to obtain the reception signal strength of the second RF signal received from the base station through the antenna using the RFIC, configure power of the first RF signal to be transmitted to the base station through the antenna, based on the reception signal strength, and adjust the frequency of the first reference signal if the power is configured to be greater than or equal to a threshold value and if the second condition is included in the control signal.

The processor may include a communication processor constituting a cellular communication circuit together with the RFIC.

In the case where the RFIC includes a filter configured to filter an analog signal in a specified first baseband from an analog signal received from the processor and output the same, the processor may be configured to adjust the first baseband to pass through the filter by a value by which the frequency of the first reference signal is adjusted.

In various embodiments, an electronic device (e.g., the electronic device 300 in FIG. 3) may include: a plurality of antennas; a processor; an RFIC configured to generate a first RF signal in a specified frequency band to be used in cellular communication by mixing a first baseband signal received from the processor with a first reference signal, output the first RF signal to a first antenna among the plurality of antennas, receive, from the first antenna, a second RF signal in a specified frequency band to be used in the cellular communication, generate a second baseband signal by mixing the second RF signal with a second reference signal, and output the second baseband signal to the processor; and a wireless communication circuit configured to support wireless communication other than the cellular communication. The processor may be configured to obtain information about the quality of a third RF signal received by the wireless communication circuit through a second antenna among the plurality of antennas (the operation 1510 in FIG. 15), obtain a control signal used to establish a communication channel between a base station and the electronic device from a second baseband signal received from the RFIC if the quality is identified to be less than or equal to a reference value, identify, from the control signal, a condition for causing desense of the third RF signal received by the wireless communication circuit through the second antenna (e.g., the operations 1520 and 1530 in FIG. 15), and adjust a frequency of the first reference signal if the condition is satisfied (e.g., the operation 1540 in FIG. 15).

In the case where the RFIC is configured to generate a first RF signal in an uplink band having a center frequency of about 2.4 GHz, the wireless communication circuit may include a Wi-Fi communication circuit supporting wireless communication in a band of about 2.4 GHz. In the case where the RFIC is configured to generate a first RF signal in an uplink band having a center frequency of about 725.5 MHz, the wireless communication circuit may include a GPS reception circuit configured to receive a GPS signal in a band of about 1.5 GHz. The condition may include: a number of transmission channel; a bandwidth of the transmission channel; and a frequency band of a first RF signal to be transmitted to the base station through the antenna in the transmission channel.

In various embodiments, a method of operating an electronic device (e.g., the electronic device 300 in FIG. 3) may include: obtaining a control signal used to establish a communication channel between a base station and the electronic device from an RFIC of the electronic device; identifying, from the control signal, a condition for causing desense of an RF signal received by the RFIC from the base station; and adjusting a frequency of a reference signal if the condition is satisfied. The reference signal may be a signal used to generate an RF signal to be transmitted by the RFIC to the base station.

The method may further include: obtaining the reception signal strength of the RF signal received from the base station through the antenna using the RFIC; based on the reception signal strength, configuring power of the RF signal to be transmitted to the base station through the antenna. The adjusting may be performed if the power is configured to be greater than or equal to a threshold value and if the condition is satisfied.

The method may further include measuring an error rate of a baseband signal obtained by processing an RF signal received from the base station through the antenna in the RFIC. The adjusting may be performed if the measured error rate is identified to be equal to or greater than a threshold value and if the first condition is satisfied.

The embodiments of the disclosure disclosed in the specification and drawings are merely provided for specific examples in order to easily explain the technical contents according to the embodiments of the disclosure and help the understanding of the embodiments of the disclosure, and are not intended to limit the scope of the embodiments of the disclosure. Therefore, the scope of various embodiments of the disclosure should be interpreted to encompass all changes or modifications derived from the technical ideas of various embodiments of disclosure, as well as the embodiments disclosed herein.

What is claimed is:

1. An electronic device comprising:
- an antenna;
- a processor; and
- a radio frequency integrated circuit (RFIC) configured to:
  - generate a first radio frequency (RF) signal in a frequency band to be used in cellular communication by mixing a first baseband signal with a first reference signal,
  - output the first RF signal to the antenna,
  - receive, from a base station through the antenna, a second RF signal in a frequency band to be used in the cellular communication,
  - generate a second baseband signal by mixing the second RF signal with a second reference signal, and
  - output, to the processor, the second baseband signal,
- wherein the processor is configured to:
  - obtain, from the second baseband signal output by the RFIC, a control signal for establishing a communication channel between the base station and the electronic device, the control signal comprising first information indicating a first frequency band and a first bandwidth of a transmission channel of the communication channel and second information indicating a second frequency band and a second bandwidth of a reception channel of the communication channel, based on a performance metric of the second RF signal exceeding a predetermined performance limit, compare the control signal with frequency configuration information, based on the comparison of the control signal with the frequency configuration information, determine that information, in the control signal, matching a first condition for causing desense of the second RF signal exists in the frequency configuration information, and based on the performance metric exceeding the predetermined performance limit and based on the determination that the information matching the first condition exists in the frequency configuration information, adjust a frequency of the first reference signal to an alternate frequency indicated by the frequency configuration information corresponding to the control signal.

2. The electronic device of claim 1, wherein the processor is further configured to:

obtain a reception signal strength of the second RF signal received from the base station through the antenna using the RFIC, based on the reception signal strength, configure a power of the first RF signal to be transmitted to the base station through the antenna, and based on the power being configured to be greater than or equal to a threshold value and the first condition being satisfied, adjust the frequency of the first reference signal.

3. The electronic device of claim 1, wherein the processor is further configured to:

measure an error rate of the second baseband signal received from the RFIC, and based on the measured error rate being identified to be equal to or greater than a threshold value and the first condition being satisfied, adjust the frequency of the first reference signal.

4. The electronic device of claim 3, wherein a value capable of being configured as the frequency of the first reference signal is a default value, a first value that is greater than the default value, or a second value that is smaller than the default value, and wherein the processor is further configured to:

based on the measured error rate being identified to be equal to or greater than the threshold value and the first condition being satisfied, change the frequency of the first reference signal from the default value to one of the first value and the second value, and based on the measured error rate being identified to be equal to or greater than the threshold value in a state in which the frequency of the first reference signal is configured as one of the first value and the second value, change the frequency of the first reference signal to a remaining one of the first value and the second value.

5. The electronic device of claim 1, wherein the first condition comprises:

a number of the transmission channel;

a bandwidth of the transmission channel;

the frequency band of the first RF signal to be transmitted to the base station through the antenna in the transmission channel; and the frequency band of the second RF signal received from the base station in the reception channel.

6. The electronic device of claim 1, further comprising a wireless communication circuit configured to support wireless communication other than the cellular communication, wherein the processor is further configured to:

identify that a second condition for causing desense of a third RF signal received by the wireless communication circuit from an outside is included in the control signal, and based on the second condition being included in the control signal, adjust the frequency of the first reference signal.

7. The electronic device of claim 6, wherein the RFIC is further configured to generate the first RF signal in an uplink band having a center frequency of about 2.4 GHz, and wherein the wireless communication circuit comprises a Wi-Fi communication circuit supporting wireless communication in a band of about 2.4 GHz.

8. The electronic device of claim 6, wherein the RFIC is further configured to generate the first RF signal in an uplink band having a center frequency of about 725.5 MHz, and wherein the wireless communication circuit comprises a Global Positioning System (GPS) reception circuit configured to receive a GPS signal in a band of about 1.5 GHz.

9. The electronic device of claim 6, wherein the second condition comprises:

a number of the transmission channel;

a bandwidth of the transmission channel; and the frequency band of the first RF signal to be transmitted to the base station through the antenna in the transmission channel.

10. The electronic device of claim 6, wherein the processor is further configured to:

obtain information about a quality of the third RF signal received by the wireless communication circuit, and based on the quality being identified to be equal to or less than a reference value and the second condition being included in the control signal, adjust the frequency of the first reference signal.

11. The electronic device of claim 6, wherein the processor is further configured to:

obtain a reception signal strength of the second RF signal received from the base station through the antenna using the RFIC, based on the reception signal strength, configure power of the first RF signal to be transmitted to the base station through the antenna, and based on the power being configured to be greater than or equal to a threshold value and the second condition being included in the control signal, adjust the frequency of the first reference signal.

12. The electronic device of claim 1, wherein the processor comprises a communication processor constituting a cellular communication circuit together with the RFIC.

13. The electronic device of claim 1, wherein the RFIC comprises a filter configured to filter an analog signal in a specified first baseband from an analog signal received from the processor and output the filtered analog signal, and wherein the processor is further configured to adjust the specified first baseband to pass through the filter by a value by which the frequency of the first reference signal is adjusted.

14. An electronic device comprising:

a plurality of antennas;

a processor;

a radio frequency integrated circuit (RFIC) configured to:
generate a first radio frequency (RF) signal in a frequency band to be used in cellular communication by mixing a first baseband signal with a first reference signal,
output the first RF signal to a first antenna among the plurality of antennas,
receive, from a base station through the first antenna, a second RF signal in a frequency band to be used in the cellular communication,
generate a second baseband signal by mixing the second RF signal with a second reference signal, and
output, to the processor, the second baseband signal; and
a wireless communication circuit configured to support wireless communication other than the cellular communication,
wherein the processor is configured to:
obtain information about a quality of a third RF signal received by the wireless communication circuit through a second antenna among the plurality of antennas,
based on the quality being identified to be less than or equal to a reference value, obtain, from the second baseband signal received from the RFIC, a control signal for establishing a communication channel between the base station and the electronic device, and compare the control signal with frequency configuration information, the control signal comprising first information indicating a first frequency band and a first bandwidth of a transmission channel of the communication channel and second information indicating a second frequency band and a second bandwidth of a reception channel of the communication channel,
based on the comparison of the control signal with the frequency configuration information, determine that information, in the control signal, matching a condition for causing desense of the third RF signal received by the wireless communication circuit through the second antenna exists in the frequency configuration information, and
based on the quality being identified to be less than or equal to the reference value and based on the determination that the information matching the condition exists in the frequency configuration information, adjust a frequency of the first reference signal to an alternate frequency indicated by the frequency configuration information corresponding to the control signal.

15. The electronic device of claim 14, wherein the RFIC is further configured to generate the first RF signal in an uplink band having a center frequency of about 2.4 GHz, and
wherein the wireless communication circuit comprises a Wi-Fi communication circuit supporting wireless communication in a band of about 2.4 GHz.

16. The electronic device of claim 14, wherein the RFIC is further configured to generate the first RF signal in an uplink band having a center frequency of about 725.5 MHz, and
wherein the wireless communication circuit comprises a Global Positioning System (GPS) reception circuit configured to receive a GPS signal in a band of about 1.5 GHz.

17. The electronic device of claim 14, wherein the condition comprises:
a number of the transmission channel;
a bandwidth of the transmission channel; and
the frequency band of the first RF signal to be transmitted to the base station through the first antenna in the transmission channel.

18. A method of operating an electronic device, the method comprising:
obtaining, from a baseband signal output by a radio frequency integrated circuit (RFIC) of the electronic device, a control signal for establishing a communication channel between a base station and the electronic device, the control signal comprising first information indicating a first frequency band and a first bandwidth of a transmission channel of the communication channel and second information indicating a second frequency band and a second bandwidth of a reception channel of the communication channel;
based on a performance metric of a radio frequency (RF) signal received by the RFIC from the base station exceeding a predetermined performance limit, comparing the control signal with frequency configuration information;
based on the comparing of the control signal with the frequency configuration information, determining that information, in the control signal, matching a condition for causing desense of the RF signal received by the RFIC from the base station exists in the frequency configuration information; and
based on the performance metric of the RF signal received by the RFIC from the base station exceeding the predetermined performance limit and based on the determination that information matching the condition exists in the frequency configuration information, adjusting a frequency of a reference signal to an alternate frequency indicated by the frequency configuration information corresponding to the control signal,
wherein the reference signal is a signal used to generate an RF signal to be transmitted by the RFIC to the base station.

19. The method of claim 18, further comprising:
obtaining a reception signal strength of the RF signal received from the base station through an antenna using the RFIC; and
based on the reception signal strength, configuring power of the RF signal to be transmitted to the base station through the antenna,
wherein the adjusting the frequency of the reference signal comprises, based on the power being configured to be greater than or equal to a threshold value and the condition being satisfied, adjusting the frequency of the reference signal.

20. The method of claim 18, further comprising measuring an error rate of a baseband signal obtained by processing the RF signal received from the base station through an antenna in the RFIC,
wherein the adjusting the frequency of the reference signal comprises, based on the measured error rate being identified to be equal to or greater than a threshold value and the condition being satisfied, adjusting the frequency of the reference signal.

* * * * *